US011875150B2

(12) United States Patent
Ramesh

(10) Patent No.: US 11,875,150 B2
(45) Date of Patent: *Jan. 16, 2024

(54) CONVERTING FLOATING-POINT BIT STRINGS IN A MULTI-USER NETWORK

(71) Applicant: Micron Technology, Inc., Boise, ID (US)

(72) Inventor: Vijay S. Ramesh, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 309 days.

This patent is subject to a terminal disclaimer.

(21) Appl. No.: 17/212,115

(22) Filed: Mar. 25, 2021

(65) Prior Publication Data

US 2021/0216311 A1 Jul. 15, 2021

Related U.S. Application Data

(63) Continuation of application No. 16/286,941, filed on Feb. 27, 2019, now Pat. No. 10,990,387.

(51) Int. Cl.
*G06F 9/30* (2018.01)
*G06F 16/901* (2019.01)
(Continued)

(52) U.S. Cl.
CPC ........ *G06F 9/3001* (2013.01); *G06F 9/30018* (2013.01); *G06F 9/30025* (2013.01);
(Continued)

(58) Field of Classification Search
CPC ... G06F 9/3001; G06F 9/30025; G06F 9/5016
See application file for complete search history.

(56) References Cited

U.S. PATENT DOCUMENTS 4,758,972 A 7/1988 Frazier
5,652,862 A 7/1997 Hanson
(Continued)

FOREIGN PATENT DOCUMENTS

CN 109213723 1/2019

OTHER PUBLICATIONS

International Search Report and Written Opinion from related International Application No. PCT/US2020/015369, dated May 21, 2020, 10 pages.

(Continued)

*Primary Examiner* — Jacob Petranek
(74) *Attorney, Agent, or Firm* — Brooks, Cameron & Huebsch, PLLC

(57) ABSTRACT

Systems, apparatuses, and methods related to arithmetic and logical operations in a multi-user network are described. Circuitry may be part of a pool of shared computing resources in a multi-user network. Data (e.g., one or more bit strings) received by the circuitry may be selectively operated upon. The circuitry can perform operations on data to convert the data between one or more formats, such as floating-point and/or universal number (e.g., posit) formats and can further perform arithmetic and/or logical operations on the converted data. For instance, the circuitry may be configured to receive a request to perform an arithmetic operation and/or a logical operation using at least one posit bit string operand. The request can include a parameter corresponding to performance of the operation. The circuitry can perform the arithmetic operation and/or the logical operation based, at least in part, on the parameter.

20 Claims, 7 Drawing Sheets

(51) Int. Cl.
  *G06F 9/50* (2006.01)
  *G06F 9/455* (2018.01)
(52) U.S. Cl.
  CPC .............. *G06F 9/50* (2013.01); *G06F 9/5016* (2013.01); *G06F 16/9024* (2019.01); *G06F 9/45533* (2013.01); *G06F 2209/5011* (2013.01)

(56) References Cited

U.S. PATENT DOCUMENTS

| | | | |
|---|---|---|---|
| 7,865,541 | B1 | 1/2011 | Langhammer |
| 8,214,417 | B2 | 7/2012 | Ahmed |
| 2003/0154366 | A1 | 8/2003 | Chow et al. |
| 2009/0254917 | A1 | 10/2009 | Ohtani |
| 2012/0311299 | A1 | 12/2012 | Blumrich et al. |
| 2014/0173616 | A1 | 6/2014 | Bird et al. |
| 2014/0297491 | A1 | 10/2014 | Cao et al. |
| 2018/0217838 | A1 | 8/2018 | Chen et al. |
| 2018/0276040 | A1 | 9/2018 | Hosmani et al. |
| 2019/0004878 | A1 | 1/2019 | Adler et al. |
| 2019/0087229 | A1* | 3/2019 | Iuliano ................ G06F 12/0842 |
| 2020/0073706 | A1 | 3/2020 | McCallum et al. |

OTHER PUBLICATIONS

Shin Yee Chung, "Provably Correct Posit Arithmetic with Fixed-Point Big Integer", CoNGA '18: Proceedings of the Conference for Next Generation Arithmetic, Article No. 2, Mar. 2018, retrieved from <https://dl.acm.org/doi/10.1145/3190339.3190341>, 4 pages.

Gustafson, et al., "Beating Floating Point as its Own Game: Posit Arithmetic", Research Paper, retrieved from <http://www.johngustafson.net/pdfs/BeatingFloatingPoint.pdf>, Jan. 2017, 16 pages.

Moritz Barthel, Jochen Rust and Steffen Paul. "Hardware Implementation of Basic Arithmetics and Elementary Functions for Unum Computing" 2018 52nd Asilomar Conference on Signals, Systems, and Computers. (Year: 2018).

Manish Kumar Jaiswal and Hayden K.-H So. "Universal Number Posit Arithmetic Generator on FPGA" Design, Automation And Test in Europe (Date Mar. 2018) (Year: 2018).

Artur Podobas and Satoshi Matsuoka. "Hardware Implementation of POSITS and Their Application in FPGAs" May 21-25, 2018 IEEE International Parallel and Distributed Processing Symposium Workshops (Year: 2018).

Manish Kumar Jaiswal and Hayden K.-H So. "Architecture Generator for Type-3 Unum Posit Adder/Subtractor" 2018 IEEE (Year: 2018).

Office Action from related China Patent Application No. 202080016545.5, dated Mar. 17, 2022, 10 pages.

Kidane Hiliwi Leake et al: "NoC Based Virtualized Accelerators for Cloud Computing", 2016 IEEE 10th International Symposium on Embedded MUL Ticore/Many-Core Systems-on-Chip (MCSOC), IEEE, Sep. 21, 2016 (Sep. 21, 2016), pp. 133-137.

Ivan Gonzalez et al: "Virtualization of reconfigurable coprocessors in HPRC systems with multicore architecture", Journal of Systems Architecture, Elsevier By, NL, vol. 58, No. 6, Mar. 12, 2012 (Mar. 12, 2012), pp. 247-256.

* cited by examiner

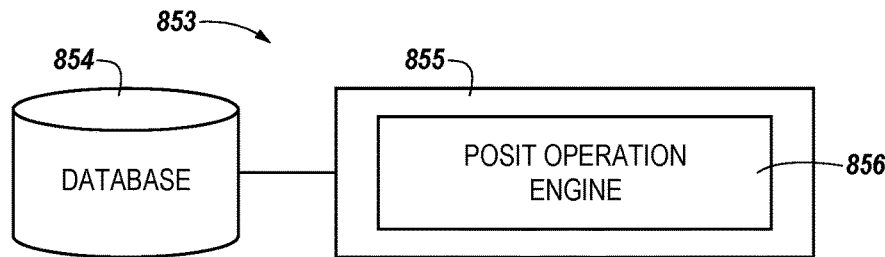

FIG. 8

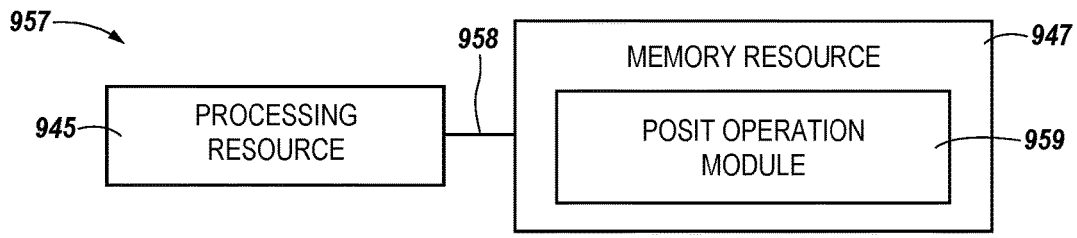

FIG. 9

```
                                                              ┌─ 1060
┌─────────────────────────────────────────────────────────────────┐
│ RECEIVING A REQUEST TO PERFORM AN ARITHMETIC OPERATION OR A LOGICAL OPERATION, │
│ OR BOTH, BETWEEN A FIRST POSIT BIT STRING OPERAND AND A SECOND POSIT BIT STRING │
│ OPERAND, WHEREIN THE REQUEST INCLUDES A PARAMETER CORRESPONDING TO AN │─ 1062
│ AMOUNT OF SHARED COMPUTING RESOURCES TO BE ALLOCATED FOR PERFORMANCE OF │
│ THE ARITHMETIC OPERATION OR THE LOGICAL OPERATION, OR BOTH, AND WHEREIN THE │
│ PARAMETER INCLUDES A FIRST BIT STRING LENGTH AND A FIRST EXPONENT BIT STRING │
│ LENGTH FOR THE FIRST POSIT BIT STRING OPERAND AND A SECOND BIT STRING LENGTH AND │
│ A SECOND EXPONENT BIT STRING LENGTH FOR THE SECOND POSIT BIT STRING OPERAND │
└─────────────────────────────────────────────────────────────────┘
```

SETTING THE FIRST BIT STRING LENGTH AND THE FIRST EXPONENT BIT LENGTH FOR THE FIRST BIT STRING OPERAND BASED ON THE PARAMETER AND SETTING THE SECOND BIT STRING LENGTH AND THE SECOND EXPONENT BIT LENGTH FOR THE SECOND BIT STRING OPERAND BASED ON THE PARAMETER

ALLOCATING, BASED, AT LEAST IN PART, ON THE PARAMETER, THE AMOUNT OF SHARED COMPUTING RESOURCES TO BE USED IN PERFORMANCE OF THE ARITHMETIC OPERATION OR THE LOGICAL OPERATION, OR BOTH, WHEREIN THE PARAMETER INCLUDES A FIRST BIT STRING LENGTH AND A FIRST EXPONENT BIT LENGTH FOR THE FIRST ─ 1064
BIT STRING OPERAND AND A SECOND BIT STRING LENGTH AND A SECOND EXPONENT BIT LENGTH FOR THE SECOND BIT STRING

CAUSING PERFORMANCE OF THE ARITHMETIC OPERATION OR THE LOGICAL OPERATION, OR BOTH, USING THE ALLOCATED AMOUNT OF SHARED ─ 1066
COMPUTING RESOURCES

FIG. 10

CONVERTING FLOATING-POINT BIT STRINGS IN A MULTI-USER NETWORK

PRIORITY INFORMATION

This application is a continuation of U.S. application Ser. No. 16/286,941, filed Feb. 27, 2019, the contents of which are incorporated herein by reference.

TECHNICAL FIELD

The present disclosure relates generally to semiconductor memory and methods, and more particularly, to apparatuses, systems, and methods related to arithmetic and logical operations in a multi-user network.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

A host and/or memory device may operate in a multi-user network (e.g., a software defined data center) in which virtual machines (VMs), virtual workloads, data compute nodes, clusters, and containers, among others, are deployed. A VM is a software implementation of a computer that executes application software analogously to a physical computer. VMs have the advantage of not being bound to physical resources, which allows VMs to be moved around and scaled to meet changing demands of an enterprise without affecting the use of the enterprise's applications. VMs can be deployed on a hypervisor provisioned with a pool of computing resources (e.g., processing resources, memory devices, which can include memory resources, etc.).

BRIEF DESCRIPTION OF THE DRAWINGS

FIG. 8 is a diagram of an apparatus in accordance with a number of embodiments of the present disclosure.

FIG. 9 is a diagram of a machine in accordance with a number of embodiments of the present disclosure.

FIG. 10 is a flow diagram representing an example method involving arithmetic and logical operations in a multi-user network in accordance with a number of embodiments of the present disclosure.

DETAILED DESCRIPTION

Figure 1:
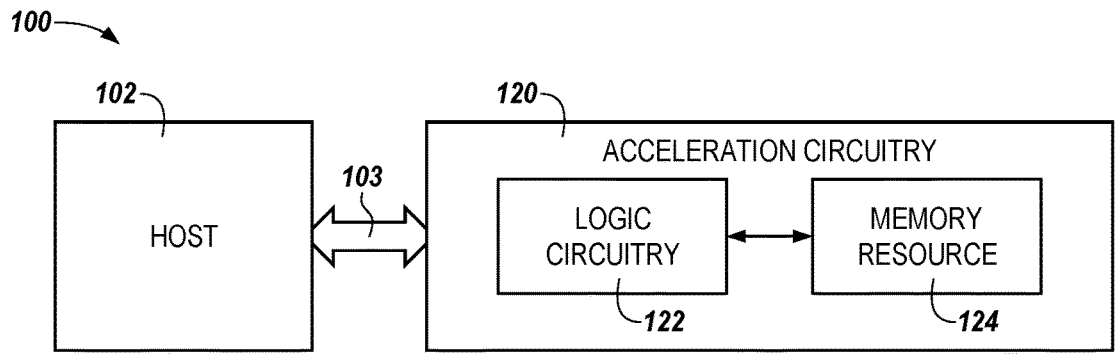
FIG. 1 is a functional block diagram in the form of a computing system including an apparatus including a host and acceleration circuitry in accordance with a number of embodiments of the present disclosure.

Systems, apparatuses, and methods related to arithmetic and logical operations in a multi-user network are described. Circuitry may be part of a pool of shared computing resources in a multi-user network. Data (e.g., one or more bit strings) received by the circuitry may be selectively operated upon. The circuitry can perform operations on data to convert the data between one or more formats, such as floating-point and/or universal number (e.g., posit) formats, and can further perform arithmetic and/or logical operations on the converted data. For instance, the circuitry may be configured to receive a request to perform an arithmetic operation and/or a logical operation using at least one posit bit string operand. The request can include a parameter corresponding to performance of the operation. The circuitry can perform the arithmetic operation and/or the logical operation based, at least in part, on the parameter.

Computing systems may perform a wide range of operations that can include performing various calculations, which can require differing degrees of accuracy. However, computing systems and/or multi-user networks have a finite amount of resources with which to perform such operations. For example, memory resources in which to store operands with which calculations are to be performed and/or processing resources used to carry out such calculations may be finite in a computing system or multi-user network. In order to facilitate performance of operations using operands stored by a computing system or multi-user network within the constraints imposed by finite resources, in some approaches operands are stored in particular formats. One such format is referred to as the "floating-point" format, or "float," for simplicity (e.g., the IEEE 754 floating-point format).

Under the floating-point standard, bit strings (e.g., data, strings of bits that can represent a number, etc.), such as binary number strings, are represented in terms of three sets of integers or sets of bits—a set of bits referred to as a "base," a set of bits referred to as an "exponent," and a set of bits referred to as a "mantissa" (or significand). The sets of integers or bits that define the format in which a binary number string is stored may be referred to herein as a "format." For example, the three sets of integers of bits described above (e.g., the base, exponent, and mantissa) that define a floating-point bit string may be referred to as a format (e.g., a first format). As described in more detail below, a posit bit string may include four sets of integers or sets of bits (e.g., a sign, a regime, an exponent, and a mantissa), which may also be referred to as a "format" (e.g., a second format). In addition, under the floating-point standard, two infinities (e.g., +∞ and −∞) and/or two kinds of "NaN" (not-a-number): a quiet NaN and a signaling NaN, may be included in a bit string.

The floating-point standard has been used in computing systems for a number of years and defines arithmetic formats, interchange formats, rounding rules, operations, and exception handling for computation carried out by many computing systems. Arithmetic formats can include binary and/or decimal floating-point data, which can include finite numbers, infinities, and/or special NaN values. Interchange formats can include encodings (e.g., bit strings) that may be used to exchange floating-point data. Rounding rules can include a set of properties that may be satisfied when rounding numbers during arithmetic operations and/or conversion operations. Floating-point operations can include arithmetic operations and/or other computational operations such as trigonometric functions. Exception handling can include indications of exceptional conditions, such as division by zero, overflows, etc.

An alternative format to floating-point is referred to as a "universal number" (unum) format. There are several forms of unum formats—Type I unums, Type II unums, and Type III unums, which can be referred to as "posits" and/or "valids." Type I unums are a superset of the IEEE 754 standard floating-point format that use a "ubit" at the end of the fraction to indicate whether a real number is an exact float, or if it lies in the interval between adjacent floats. The sign, exponent, and fraction bits in a Type I unum take their definition from the IEEE 754 floating-point format, however, the length of the exponent and fraction fields of Type I unums can vary dramatically, from a single bit to a maximum user-definable length. By taking the sign, exponent, and fraction bits from the IEEE 754 standard floating-point format, Type I unums can behave similar to floating-point numbers, however, the variable bit length exhibited in the exponent and fraction bits of the Type I unum can require additional management in comparison to floats.

Type II unums are generally incompatible with floats, which permits a clean, mathematical design based on projected real numbers. A Type II unum can include n bits and can be described in terms of a "u-lattice" in which quadrants of a circular projection are populated with an ordered set of $2^{n-3}-1$ real numbers. The values of the Type II unum can be reflected about an axis bisecting the circular projection such that positive values lie in an upper right quadrant of the circular projection, while their negative counterparts lie in an upper left quadrant of the circular projection. The lower half of the circular projection representing a Type II unum can include reciprocals of the values that lie in the upper half of the circular projection. Type II unums generally rely on a look-up table for most operations. For example, the size of the look-up table can limit the efficacy of Type II unums in some circumstances. However, Type II unums can provide improved computational functionality in comparison with floats under some conditions.

The Type III unum format is referred to herein as a "posit format" or, for simplicity, a "posit." In contrast to floating-point bit strings, posits can, under certain conditions, allow for a broader dynamic range and a higher accuracy (e.g., precision) than floating-point numbers with the same bit width. This can allow for operations performed by a computing system or multi-user network to be performed at a higher rate (e.g., faster) when using posits than with floating-point numbers, which, in turn, can improve the performance of the computing system or multi-user network by, for example, reducing a number of clock cycles used in performing operations thereby reducing processing time and/or power consumed in performing such operations. In addition, the use of posits in computing systems or multi-user networks can allow for higher accuracy and/or precision than floating-point numbers, which can further improve the functioning of a computing system or multi-user network in comparison to some approaches (e.g., approaches which rely upon floating-point bit strings).

Embodiments herein are directed to hardware circuitry (e.g., logic circuitry, arithmetic logic units, field-programmable gate arrays, application-specific integrated circuits, etc.) configured to perform various operations using bit strings to improve the overall functioning of a computing device and/or a multi-user network (e.g., a software defined data center, cloud computing environment, etc.). For example, embodiments herein are directed to hardware circuitry that is deployed in a computing device or multi-user network and configured to perform conversion operations to convert a format of a bit string from a first format (e.g., a floating-point format) to a second format (e.g., a unum format, a posit format, etc.). Once the bit string(s) have been converted to the second format, the circuitry can be operated to perform operations (e.g., arithmetic operations, logical operations, bit-wise operations, vector operations, etc.) on the converted bit strings.

In some embodiments, the circuitry can be further operated to convert the results of the operations back to the first format (e.g., to a floating-point format), which can, in turn, be transferred to different circuitry (e.g., a host, a memory device, a portion of shared computing resources, etc.) of the computing system or multi-user network. By performing the operations in such a manner, the circuitry can facilitate improved performance of the computing system or multi-user network by allowing for improved accuracy and/or precision in the performed operations, improved speed in performing the operations, and/or a reduced required storage space for bit strings prior to, during, or subsequent to, performance of arithmetic operations, logical operations, or other operations.

In some embodiments, the circuitry may be deployed as part of a pool of shared computing resources in a multi-user network. As used herein, a "multi-user network" generally refers to a collection of computing systems in which one or more hosts (e.g., host computing systems) are configured to provide computing functionality via a network such as the Internet. Multi-user networks are dynamic in nature. For example, virtual computing instances (VCIs) and/or various application services, may be created, used, moved, or destroyed within the multi-user network. When VCIs are created (e.g., when a container is initialized), various processes and/or services start running and consuming resources.

In a multi-user network, resources are accessible by multiple users in disparate geographical locations that are not necessarily the same geographical location(s) in which the computing resources are located. As used herein, "resources" are physical or virtual components that have a finite availability within a computer or multi-user network. For example, resources include processing resources, memory resources, electrical power, and/or input/output resources, etc. A multi-user network may include a pool of shared resources (e.g., processing resources, memory resources, etc.) that are shared by multiple users. A multi-user network may be referred to herein in the alternative as a software defined data center or a cloud computing environment.

In some embodiments, the circuitry may be accessed by a VCI as part of the shared pool of computing resources available to the VCI. For example, the circuitry can be deployed in a memory device that is provided as part of the shared pool of computing resources available to the multi-user network. Embodiments are not so limited, however, and the circuitry can be deployed on a host, blade server, graphics processing unit, field-programmable gate array, application-specific integrated circuit, or other physical or virtualized hardware component that is provided as part of the shared pool of computing resources available to the multi-user network.

The term "virtual computing instance" (VCI) covers a range of computing functionality. VCIs may include data compute nodes such as virtual machines (VMs) that run on a hypervisor. In contrast, containers can run on a host operating system without a hypervisor or separate operating system, such as a container that runs within Linux. A container can be provided by a virtual machine (VM) that includes a container virtualization layer (e.g., Docker). A VM refers generally to an isolated end user space instance, which can be executed within a virtualized environment. Other technologies aside from hardware virtualization can provide isolated end user space instances may also be referred to as VCIs. The term "VCI" covers these examples and combinations of different types of VCIs, among others.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system.

The host operating system can use name spaces to isolate the containers from each other and therefore can provide operating-system level segregation of the different groups of applications that operate within different containers. This segregation is akin to the VM segregation that may be offered in hypervisor-virtualized environments that virtualize system hardware, and thus can be viewed as a form of virtualization that isolates different groups of applications that operate in different containers. Such containers may be more "lightweight" than VMs at least because they share an operating system rather than operating with their own guest operating system.

Multiple VCIs can be configured to be in communication with each other in a multi-user network. In such a system, information can be propagated from an end user to at least one of the VCIs in the system, between VCIs in the system, and/or between at least one of the VCIs in the system and a non-virtualized physical host.

Containerized cloud-native applications can be used to accelerate application delivery in multi-user networks. As used herein, "containerized" or "containerization" refers to a virtualization technique in which an application (or portions of an application, such as flows corresponding to the application) are encapsulated into a container (e.g., Docker, Linux containers, etc.) as an alternative to full machine virtualization. Because containerization can include loading the application on to a VCI, the application may be run on any suitable physical machine without worrying about application dependencies. Further, as used herein, "cloud-native applications" refer to applications (e.g., computer programs, software packages, etc.) that are assembled as containerized workloads in containers deployed in a multi-user network. "Containerized workloads" refer to a computing architecture in which an application is structured as a collection of loosely coupled (e.g., containerized) services. Containerized workload architectures may allow for improved application modularity, scalability, and continuous deployment in comparison to traditional application development environments.

In embodiments in which the circuitry to perform operations to convert bit strings between various formats and/or perform arithmetic and/or logical operations using the bit strings is provided in a multi-user network, portions of the operations may be performed with the assistance of one or more VCIs and/or containers (e.g., containerized workloads). For example, one or more VCIs or containers may be deployed in the multi-user network and may be configured to access the circuitry to request performance of the operations to convert bit strings between various formats and/or request performance arithmetic and/or logical operations using the bit strings.

In some embodiments, the operations to convert bit strings between various formats and/or the arithmetic and/or logical operations using the bit strings can be performed based on parameters received by the multi-user network. For example, a request to perform an operation to convert bit strings between various formats and/or a request to perform arithmetic and/or logical operations on the bit strings may be accompanied by one or more parameters that correspond to performance of the operation to convert bit strings between various formats and/or the arithmetic and/or logical operations on the bit strings. The parameters can include an amount of processing resources to be used in performance of the operation(s), an amount of time to be allotted for performance of the operation(s), a bit length of the operands to be used in performance of the operation(s), and/or an exponent bit length of the operands to be used in performance of the operation(s), among others.

By performing operations to convert bit strings between various formats and/or the arithmetic and/or logical operations using the bit strings in a multi-user network based on the parameters, application developers or other users of the multi-user network may be able to fine-tune their resource consumption when requesting performance of such operations. This can allow for costs, both monetary and resource related, associated with performing large computations in a multi-user network to be curtailed in comparison with approaches that do not perform operations taking such parameters into account.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

As used herein, designators such as "N," "M," etc., particularly with respect to reference numerals in the drawings, indicate that a number of the particular feature so designated can be included. It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of memory banks) can refer to one or more memory banks, whereas a "plurality of" is intended to refer to more than one of such things.

Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled" and "coupling" mean to be directly or indirectly connected physically or for access to and movement (transmission) of commands and/or data, as appropriate to the context. The terms "bit strings," "data," and "data values" are used interchangeably herein and can have the same meaning, as appropriate to the context.

The figures herein follow a numbering convention in which the first digit or digits correspond to the figure number and the remaining digits identify an element or component in the figure. Similar elements or components between different figures may be identified by the use of similar digits. For example, 120 may reference element "20" in FIG. 1, and a similar element may be referenced as 220 in FIG. 2. A group or plurality of similar elements or components may generally be referred to herein with a single element number. For example, a plurality of reference elements 433-1, 433-2, . . . 433-N may be referred to generally as 433. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 is a functional block diagram in the form of a computing system 100 including an apparatus including a host 102 and acceleration circuitry 120 in accordance with a number of embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example. Each of the components (e.g., the host 102, the acceleration circuitry 120, the logic circuitry 122, and/or the memory resource 124) can be separately referred to herein as an "apparatus."

As illustrated in FIG. 1, a host 102 can be coupled to the acceleration circuitry 120. In a number of embodiments, the host 102 can be coupled to the acceleration circuitry 120 via one or more channels 103 (e.g., buses, interfaces, communication paths, etc.). The channel(s) 103 can be used to transfer data between the acceleration circuitry 120 and the host 102 and can be in the form of a standardized interface. For example, the channel(s) 103 can be a serial advanced technology attachment (SATA), peripheral component interconnect express (PCIe), or a universal serial bus (USB), a double data rate (DDR) interface, among other connectors and interfaces. In general, however, channel(s) 103 can provide an interface for passing control, address, data, and other signals between the acceleration circuitry 120 and a host 102 having compatible receptors for the channel(s) 103.

The host 102 can be a host system such as a personal laptop computer, a desktop computer, a digital camera, a mobile telephone, an internet-of-things (IoT) enabled device, or a memory card reader, graphics processing unit (e.g., a video card), among various other types of hosts. The host 102 can include a system motherboard and/or backplane and can include a number of memory access devices, e.g., a number of processing devices (e.g., one or more processors, microprocessors, or some other type of controlling circuitry). One of ordinary skill in the art will appreciate that "a processor" can intend one or more processors, such as a parallel processing system, a number of coprocessors, etc. The host 102 can be provided in a multi-user network (e.g. the multi-user network 201 illustrated in FIG. 2B, herein). Accordingly, in some embodiments, the host 102 can include physical and/or virtualized hardware configured to execute a host operating system.

The system 100 can include separate integrated circuits or both the host 102 and the acceleration circuitry 120 can be on the same integrated circuit. The system 100 can be, for instance, a server system and/or a high-performance computing (HPC) system and/or a portion thereof Although the example shown in FIG. 1 illustrates a system having a Von Neumann architecture, embodiments of the present disclosure can be implemented in non-Von Neumann architectures, which may not include one or more components (e.g., CPU, ALU, etc.) often associated with a Von Neumann architecture.

Figure 2A:
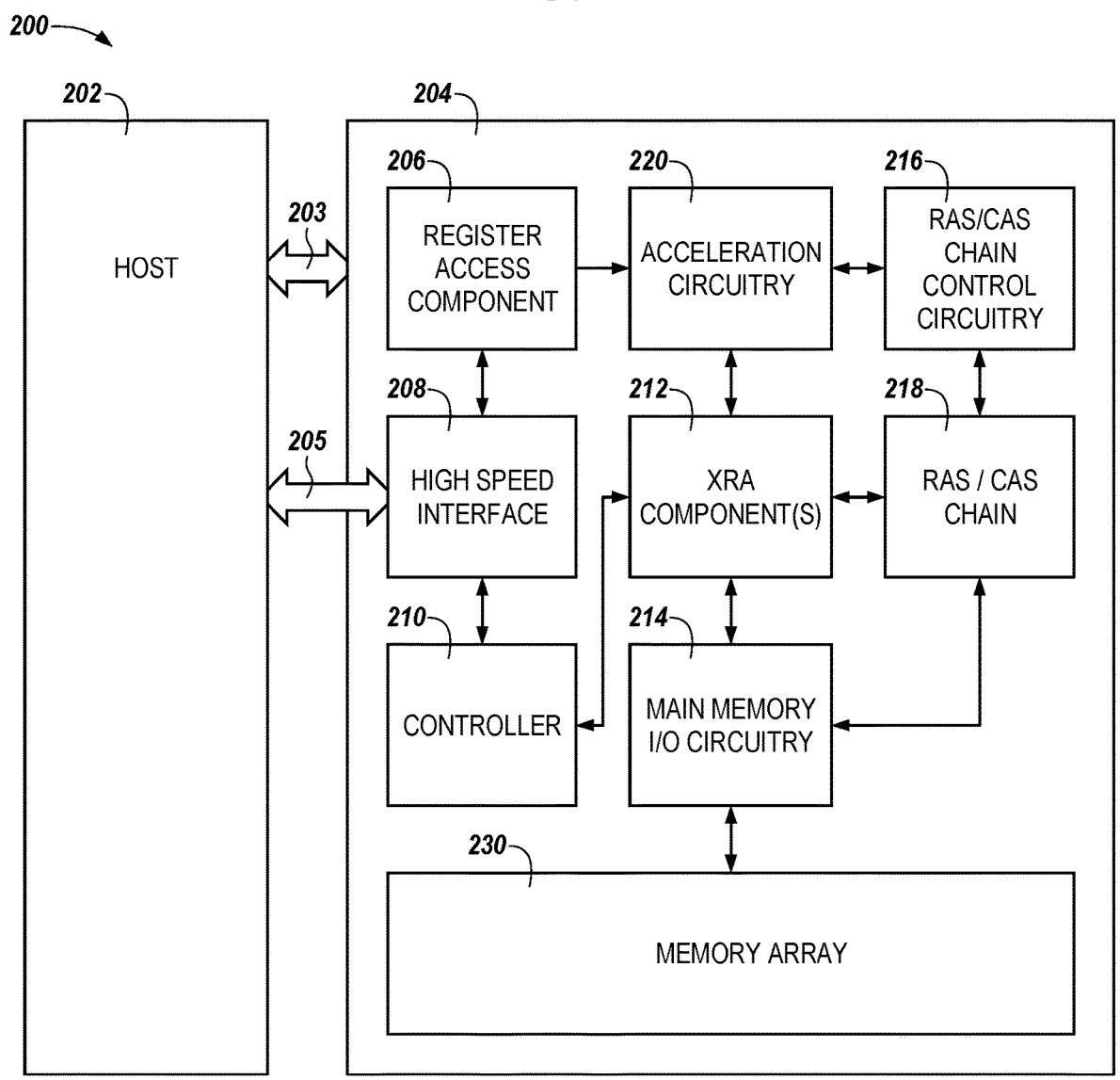
FIG. 2A is a functional block diagram in the form of a computing system including an apparatus including a host and a memory device in accordance with a number of embodiments of the present disclosure.
Figure 2B:
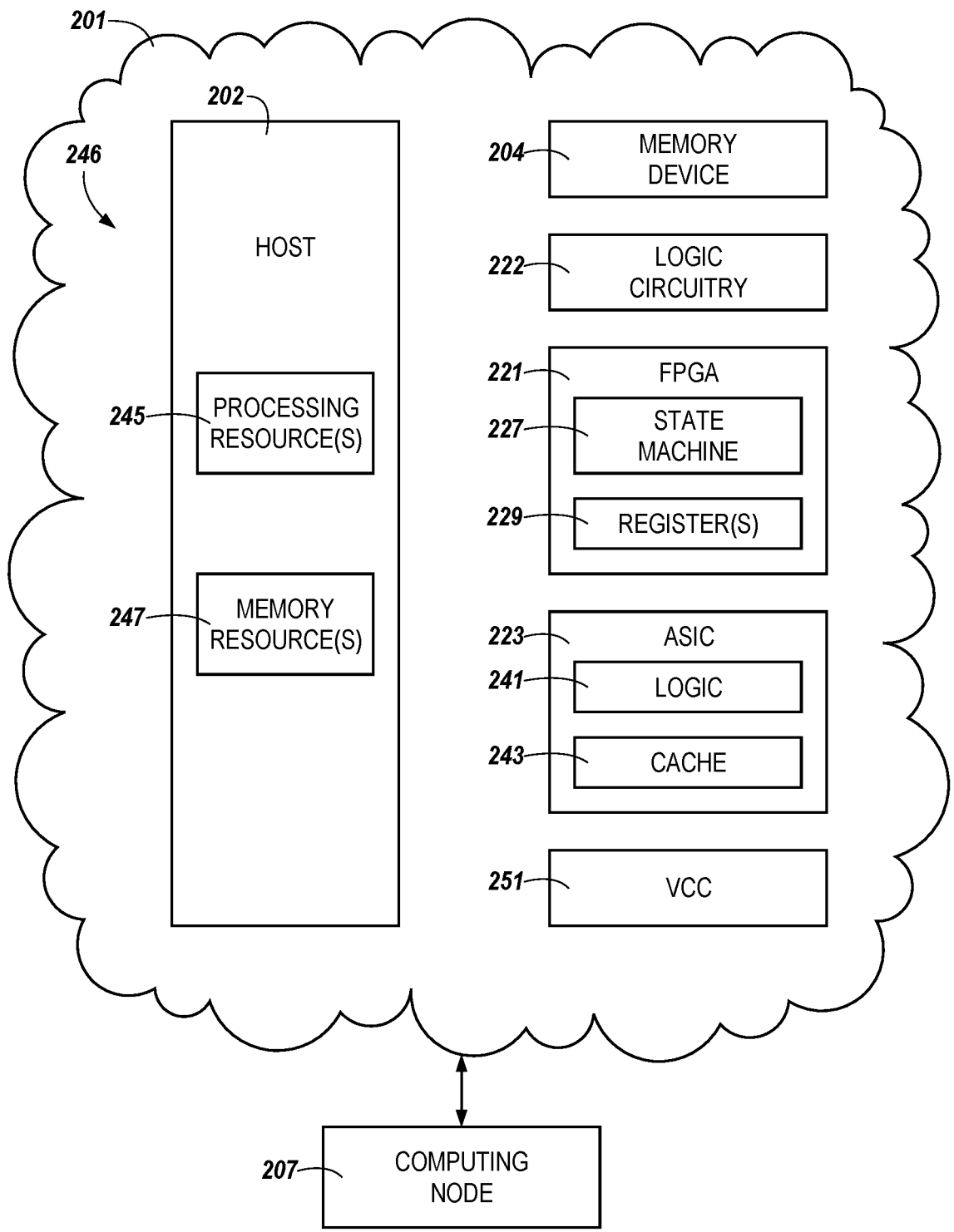
FIG. 2B is a functional block diagram in the form of a computing system deployed in a multi-user network including a host, a memory device, an application-specific integrated circuit, a field programmable gate array, and a virtual computing cluster in accordance with a number of embodiments of the present disclosure.

In some embodiments, the host 102 can be responsible for executing an operating system for a computing system 100 that includes the acceleration circuitry 120 and/or other components, such as the memory device 204 illustrated in FIGS. 2A and 2B, the field-programmable gate array 221 illustrated in FIG. 2B, the application-specific integrated circuit 223 illustrated in FIG. 2B, the virtual computing cluster 251 illustrated in FIG. 2B, etc. Accordingly, in some embodiments, the host 102 can be responsible for controlling operation of the acceleration circuitry 120. For example, the host 102 can execute instructions (e.g., in the form of an operating system) that manage the hardware of the computing system 100 such as scheduling tasks, executing applications, controlling peripherals, etc.

The acceleration circuitry 120 can include logic circuitry 122 and a memory resource 124. The logic circuitry 122 can be provided in the form of an integrated circuit, such as an application-specific integrated circuit (ASIC), field programmable gate array (FPGA), system-on-a-chip, or other combination of hardware and/or circuitry that is configured to perform operations described in more detail, herein. In some embodiments, the logic circuitry 122 can include an arithmetic logic unit (ALU). The ALU can include circuitry (e.g., hardware, logic, one or more processing devices, etc.) to perform operations (e.g., arithmetic operations, logical operations, bitwise operations, etc.) such as the operations described above, on integer binary bit strings, such as bit strings in the posit format. Embodiments are not limited to an ALU, however, and in some embodiments, the logic circuitry 122 can include a state machine and/or an instruction set architecture (or combinations thereof) in addition to, or in lieu of the ALU, as described in more detail in connection with FIGS. 2B and 5, herein.

The logic circuitry 122 can be configured to receive one or more bit strings (e.g., a plurality of bits) stored in a first fromat (e.g., a plurality of bits in a floating-point format), convert the bit string(s) to a second format (e.g., convert the bit string(s) to a posit format), and/or cause performance of operations such as arithmetic and/or logical operations using the bit string(s) having the second format. As used herein, the bit string(s) stored in the second format (e.g., bit string(s) in the posit format) include at least one bit referred to as a "sign," a set of bits referred to as a "regime," a set of bits referred to as an "exponent," and a set of bits referred to as a "mantissa" (or significand). As used herein, a set of bits is intended to refer to a subset of bits included in a bit string. Examples of the sign, regime, exponent, and mantissa sets of bits are described in more detail in connection with FIGS. 3 and 4A-4B, herein.

For example, once the floating-point bit strings are converted to bit strings in the posit format, the logic circuitry 122 can be configured to perform (or cause performance of) arithmetic operations such as addition, subtraction, multiplication, division, fused multiply addition, multiply-accumulate, dot product units, greater than or less than, absolute value (e.g., FABS( )), fast Fourier transforms, inverse fast Fourier transforms, sigmoid function, convolution, square root, exponent, and/or logarithm operations, and/or logical operations such as AND, OR, XOR, NOT, etc., as well as trigonometric operations such as sine, cosine, tangent, etc. using the posit bit strings. As will be appreciated, the foregoing list of operations is not intended to be exhaustive, nor is the foregoing list of operations intended to be limiting, and the logic circuitry 122 may be configured to perform (or cause performance of) other arithmetic operations, logical operations, bit-wise operations, vector operations, etc.

The acceleration circuitry 120 can further include a memory resource 124, which can be communicatively coupled to the logic circuitry 122. The memory resource 124 can include volatile memory resources, non-volatile memory resources, or a combination of volatile and non-volatile memory resources. In some embodiments, the memory resource can be a random-access memory (RAM) such as static random-access memory (SRAM). Embodiments are not so limited, however, and the memory resource can be a cache, one or more registers, NVRAM, ReRAM, FeRAM, MRAM, PCM), "emerging" memory devices such as 3-D Crosspoint (3D XP) memory devices, etc., or combinations thereof. A 3D XP array of non-volatile memory can perform bit storage based on a change of bulk resistance, in conjunction with a stackable cross-gridded data access array. Additionally, in contrast to many flash-based memories, 3D XP non-volatile memory can perform a write in-place operation, where a non-volatile memory cell can be programmed without the non-volatile memory cell being previously erased.

The embodiment of FIG. 1 can include additional circuitry that is not illustrated so as not to obscure embodiments of the present disclosure. For example, the system 100 can include address circuitry to latch address signals provided over I/O connections through I/O circuitry. Address signals can be received and decoded by a row decoder and a column decoder to access devices within the system 100. It will be appreciated by those skilled in the art that the number of address input connections can depend on the density and architecture of the system 100.

FIG. 2A is a functional block diagram in the form of a computing system including an apparatus 200 including a host 202 and a memory device 204 in accordance with a number of embodiments of the present disclosure. The memory device 204 can include acceleration circuitry 220, which can be analogous to the acceleration circuitry 120 illustrated in FIG. 1. Similarly, the host 202 can be analogous to the host 102 illustrated in FIG. 1. Each of the components (e.g., the host 202, the acceleration circuitry 220, the logic circuitry 222, the memory resource 224, and/or the memory array 230, etc.) can be separately referred to herein as an "apparatus."

The host 202 can be communicatively coupled to the memory device 204 via one or more channels 203, 205. The channels 203, 205 can be interfaces or other physical connections that allow for data and/or commands to be transferred between the host 202 and the memory device 205. For example, commands to cause initiation of an operation (e.g., an operation to convert bit string(s) in a floating-point format to bit string(s) in a posit format, as well as subsequent arithmetic and/or logical operations on the bit string(s) in the posit format) to be performed by the acceleration circuitry 220 can be transferred from the host via the channels 203, 205. It is noted that, in some examples, the acceleration circuitry 220 can perform the operations in response to an initiation command transferred from the host 202 via one or more of the channels 203, 205 in the absence of an intervening command from the host 202. That is, once the acceleration circuitry 220 has received the command to initiate performance of an operation from the host 202, the operations can be performed by the acceleration circuitry 220 in the absence of additional commands from the host 202.

The memory device 204 can include one or more memory modules (e.g., single in-line memory modules, dual in-line memory modules, etc.). The memory device 204 can include volatile memory and/or non-volatile memory. In a number of embodiments, the memory device 204 can include a multi-chip device. A multi-chip device can include a number of different memory types and/or memory modules. For example, the memory device 204 can include non-volatile or volatile memory on any type of a module.

The memory device 204 can provide main memory for the computing system 200 or could be used as additional memory or storage throughout the computing system 200. The memory device 204 can include one or more memory arrays 230 (e.g., arrays of memory cells), which can include volatile and/or non-volatile memory cells. The memory array 230 can be a flash array with a NAND architecture, for example. Embodiments are not limited to a particular type of memory device. For instance, the memory device 204 can include RAM, ROM, DRAM, SDRAM, PCRAM, RRAM, and flash memory, among others.

In embodiments in which the memory device 204 includes non-volatile memory, the memory device 204 can include flash memory devices such as NAND or NOR flash memory devices. Embodiments are not so limited, however, and the memory device 204 can include other non-volatile memory devices such as non-volatile random-access memory devices (e.g., NVRAM, ReRAM, FeRAM, MRAM, PCM), "emerging" memory devices such as 3-D Crosspoint (3D XP) memory devices, etc., or combinations thereof.

As shown in FIG. 2A, the memory device 204 can include a register access component 206, a high speed interface (HSI) 208, a controller 210, one or more extended row address (XRA) component(s) 212, main memory input/output (I/O) circuitry 214, row address strobe (RAS)/column address strobe (CAS) chain control circuitry 216, a RAS/CAS chain component 218, acceleration circuitry 220, and a memory array 230. The acceleration circuitry 220 is, as shown in FIG. 2A, located in an area of the memory device 204 that is physically distinct from the memory array 230. That is, in some embodiments, the acceleration circuitry 220 is located in a periphery location of the memory array 230.

The register access component 206 can facilitate transferring and fetching of data from the host 202 to the memory device 204 and from the memory device 204 to the host 202. For example, the register access component 206 can store addresses (or facilitate lookup of addresses), such as memory addresses, that correspond to data that is to be transferred to the host 202 form the memory device 204 or transferred from the host 202 to the memory device 204. In some embodiments, the register access component 206 can facilitate transferring and fetching data that is to be operated upon by the acceleration circuitry 220 and/or the register access component 206 can facilitate transferring and fetching data that is has been operated upon by the acceleration circuitry 220 for transfer to the host 202.

The HSI 208 can provide an interface between the host 202 and the memory device 204 for commands and/or data traversing the channel 205. The HSI 208 can be a double data rate (DDR) interface such as a DDR3, DDR4, DDR5, etc. interface. Embodiments are not limited to a DDR interface, however, and the HSI 208 can be a quad data rate (QDR) interface, peripheral component interconnect (PCI) interface (e.g., a peripheral component interconnect express (PCIe)) interface, or other suitable interface for transferring commands and/or data between the host 202 and the memory device 204.

The controller 210 can be responsible for executing instructions from the host 202 and accessing the acceleration circuitry 220 and/or the memory array 230. The controller 210 can be a state machine, a sequencer, or some other type of controller. The controller 210 can receive commands from the host 202 (via the HSI 208, for example) and, based on the received commands, control operation of the acceleration circuitry 220 and/or the memory array 230. In some embodiments, the controller 210 can receive a command from the host 202 to cause performance of an operation using the acceleration circuitry 220 (e.g., to convert bit strings between various formats, perform arithmetic and/or logical operations using the bit strings, etc.). Responsive to receipt of such a command, the controller 210 can instruct the acceleration circuitry 220 to begin performance of the operation(s).

In some embodiments, the controller 210 can be a global processing controller and may provide power management functions to the memory device 204. Power management functions can include control over power consumed by the memory device 204 and/or the memory array 230. For example, the controller 210 can control power provided to various banks of the memory array 230 to control which banks of the memory array 230 are operational at different times during operation of the memory device 204. This can include shutting certain banks of the memory array 230 down while providing power to other banks of the memory array 230 to optimize power consumption of the memory device 230. In some embodiments, the controller 210 controlling power consumption of the memory device 204 can include controlling power to various cores of the memory device 204 and/or to the acceleration circuitry 220, the memory array 230, etc.

The XRA component(s) 212 are intended to provide additional functionalities (e.g., peripheral amplifiers) that sense (e.g., read, store, cache) data values of memory cells in the memory array 230 and that are distinct from the memory array 230. The XRA components 212 can include latches and/or registers. For example, additional latches can be included in the XRA component 212. The latches of the XRA component 212 can be located on a periphery of the memory array 230 (e.g., on a periphery of one or more banks of memory cells) of the memory device 204.

The main memory input/output (I/O) circuitry 214 can facilitate transfer of data and/or commands to and from the memory array 230. For example, the main memory I/O circuitry 214 can facilitate transfer of bit strings, data, and/or commands from the host 202 and/or the acceleration circuitry 220 to and from the memory array 230. In some embodiments, the main memory I/O circuitry 214 can include one or more direct memory access (DMA) components that can transfer the bit strings (e.g., posit bit strings stored as blocks of data) from the acceleration circuitry 220 to the memory array 230, and vice versa.

In some embodiments, the main memory I/O circuitry 214 can facilitate transfer of bit strings, data, and/or commands from the memory array 230 to the acceleration circuitry 220 so that the acceleration circuitry 220 can perform operations on the bit strings. Similarly, the main memory I/O circuitry 214 can facilitate transfer of bit strings that have had one or more operations performed on them by the acceleration circuitry 220 to the memory array 230. As described in more detail herein, the operations can include operations to convert bit strings formatted according to the floating-point standard to bit strings formatted as a posit (and vice versa), arithmetic operations performed on the bit strings formatted as a posit, logical operations performed on the bit strings formatted as a posit, etc.

The row address strobe (RAS)/column address strobe (CAS) chain control circuitry 216 and the RAS/CAS chain component 218 can be used in conjunction with the memory array 230 to latch a row address and/or a column address to initiate a memory cycle. In some embodiments, the RAS/CAS chain control circuitry 216 and/or the RAS/CAS chain component 218 can resolve row and/or column addresses of the memory array 230 at which read and write operations associated with the memory array 230 are to be initiated or terminated. For example, upon completion of an operation using the acceleration circuitry 220, the RAS/CAS chain control circuitry 216 and/or the RAS/CAS chain component 218 can latch and/or resolve a specific location in the memory array 230 to which the bit strings that have been operated upon by the acceleration circuitry 220 are to be stored. Similarly, the RAS/CAS chain control circuitry 216 and/or the RAS/CAS chain component 218 can latch and/or resolve a specific location in the memory array 230 from which bit strings are to be transferred to the acceleration circuitry 220 prior to the acceleration circuitry 220 performing an operation on the bit string(s).

As described above in connection with FIG. 1 and in more detail below in connection with FIG. 5, the acceleration circuitry 220 can be configured to receive one or more bit strings in a first format (e.g., a plurality of bits in a floating-point format), convert the one or more bit strings according to a second format (e.g., encode the plurality of bits in a posit format), and/or cause performance of operations such as arithmetic and/or logical operations using the one or more bit strings having the second format.

The acceleration circuitry 220 can include logic circuitry (e.g., the logic circuitry 122 illustrated in FIG. 1) and/or memory resource(s) (e.g., the memory resource 124 illustrated in FIG. 1). Bit strings (e.g., data, a plurality of bits, etc.) can be received by the acceleration circuitry 220 from, for example, the host 202 and/or the memory array 230, and stored by the acceleration circuitry 220, for example in the memory resource of the acceleration circuitry 220. The acceleration circuitry (e.g., the logic circuitry of the acceleration circuitry 220) can perform operations (or cause operations to be performed on) the bit string(s) to convert the bit string(s) from a floating-point format to a posit format, perform arithmetic and/or logical operations on the posit bit strings, and/or convert a result of the arithmetic and/or logical operation to a different format, such as a floating-point format, as described in more detail in connection with FIG. 5, herein.

As described in more detail in connection with FIGS. 3 and 4A-4B, posits can provide improved accuracy and may require less storage space (e.g., may contain a smaller number of bits) than corresponding bit strings represented in the floating-point format. Accordingly, by converting the floating-point bit strings to posit bit strings using the acceleration circuitry 220, performance of the memory device 202 may be improved in comparison to approaches that utilize only floating-point bit strings because operations may be performed more quickly on the posit bit strings (e.g., because the bit string in the posit format is smaller and therefore requires less time to perform operations on) and because less memory space is required in the memory device 204 to store the bit strings in the posit format, which can free up additional space in the memory device 202 for other bit strings, data, and/or other operations to be performed.

Once the acceleration circuitry 220 has performed the operation(s) to convert the data from the floating-point format to the posit format, the acceleration circuitry can perform (or cause performance of) arithmetic and/or logical operations on the posit bit strings. For example, as discussed above, the acceleration circuitry 220 can be configured to perform (or cause performance of) arithmetic operations such as addition, subtraction, multiplication, division, fused multiply addition, multiply-accumulate, dot product units, greater than or less than, absolute value (e.g., FABS( ), fast Fourier transforms, inverse fast Fourier transforms, sigmoid function, convolution, square root, exponent, and/or logarithm operations, and/or logical operations such as AND, OR, XOR, NOT, etc., as well as trigonometric operations such as sine, cosine, tangent, etc. As will be appreciated, the foregoing list of operations is not intended to be exhaustive, nor is the foregoing list of operations intended to be limiting, and the acceleration circuitry 220 may be configured to perform (or cause performance of) other arithmetic and/or logical operations on posit bit strings.

In some embodiments, the acceleration circuitry 220 may perform the above-listed operations in conjunction with execution of one or more machine learning algorithms. For example, the acceleration circuitry 220 may perform operations related to one or more neural networks. Neural networks may allow for an algorithm to be trained over time to determine an output response based on input signals. For example, over time, a neural network may essentially learn to better maximize the chance of completing a particular goal. This may be advantageous in machine learning applications because the neural network may be trained over time with new data to achieve better maximization of the chance of completing the particular goal. A neural network may be trained over time to improve operation of particular tasks and/or particular goals.

However, in some approaches, machine learning (e.g., neural network training) may be processing intensive (e.g., may consume large amounts of computer processing resources) and/or may be time intensive (e.g., may require lengthy calculations that consume multiple cycles to be performed). In contrast, by performing such operations using the acceleration circuitry 220, for example, by performing such operations on bit strings that have been converted by the acceleration circuitry 220 into a posit format, the amount of processing resources and/or the amount of time consumed in performing the operations may be reduced in comparison to approaches in which such operations are performed using bit strings in a floating-point format.

The acceleration circuitry 220 can be communicatively coupled to the memory array 230 via one or more channels, interfaces, and/or buses. The memory array 230 can be a DRAM array, SRAM array, STT RAM array, PCRAM array, TRAM array, RRAM array, NAND flash array, and/or NOR flash array, for instance, although embodiments are not limited to these particular examples. The memory array 230 can function as main memory for a computing system. In some embodiments, the memory array 230 can be configured to store bit strings operated on by the acceleration circuitry 220 and/or store bit strings to be transferred to the acceleration circuitry 220. The array 230 can comprise memory cells arranged in rows coupled by access lines, which may be referred to herein as word lines or select lines, and columns coupled by sense lines, which may be referred to herein as data lines or digit lines. Although a single array 230 is shown in FIG. 2A, embodiments are not so limited. For instance, memory device 204 a number of memory arrays 230 (e.g., a number of banks of DRAM cells, NAND flash cells, etc.).

The embodiment of FIG. 2A can include additional circuitry that is not illustrated so as not to obscure embodiments of the present disclosure. For example, the memory device 204 can include address circuitry to latch address signals provided over I/O connections through I/O circuitry. Address signals can be received and decoded by a row decoder and a column decoder to access the memory device 204 and/or the memory array 230. It will be appreciated by those skilled in the art that the number of address input connections can depend on the density and architecture of the memory device 204 and/or the memory array 230.

FIG. 2B is a functional block diagram in the form of a computing system 200 deployed in a multi-user network 201 that includes a pool of shared computing resources 246 including a host 202, a memory device 204, which can include logic circuitry 222, an application-specific integrated circuit 223, a field programmable gate array 221, and a virtual computing cluster (VCC) 251 in accordance with a number of embodiments of the present disclosure. As shown in FIG. 2B, the pool of shared computing resources 246 can further include processing resource(s) 245 and memory resource(s) 247, which can be included within the host 202, separate from the host 202, or a combination thereof. Each of the components (e.g., the host 202, the conversion component 211, the memory device 204, the FPGA 221, the ASIC 223, the VCC 251, etc.) can be separately referred to herein as an "apparatus."

The multi-user network 201 can be a software defined data center, cloud computing environment, data center, or other such network or computing environment in which in which virtual computing instances (VCIs), virtual machines (VMs), virtual workloads, data compute nodes, clusters, and containers, among others, are deployed. A multi-user network 201 can extend virtualization concepts such as abstraction, pooling, and automation to data center resources and services to provide information technology as a service (ITaaS). In a multi-user network 201, infrastructure, such as networking, processing, and security, can be virtualized and delivered as a service. A multi-user network 201 can include software defined networking and/or software defined storage. In some embodiments, components of a multi-user network 201 can be provisioned, operated, and/or managed through an application programming interface (API). As a result, multiple users can access resources associated with the multi-user network 201 from disparate locations via, for example, a computing node 207 that is communicatively coupled to the multi-user network 201. Although a single computing node 207 is shown in FIG. 2B, it will be appreciated that multiple computing nodes can be communicatively coupled to the multi-user network 201.

The computing node 207 can be a user device such as a personal computer, laptop computer, tablet, phablet, smartphone, or other device that can access the multi-user network 201 via, for example, an edge device. The computing node 207 can be configured to send commands to the multi-user network 201 to facilitate performance of the operations using bit strings (e.g., posit bit strings) described herein. The commands can include a command to initiate performance of operations using the bit strings and/or the commands can include one or more parameters that specify criterion under which the operations are to be performed. Table 1 shows several non-limiting examples of parameters that specify criterion under which the operations are to be performed.

TABLE 1

| Processing Time | Processing Resources | Posit Parameter | Posit Parameter | Posit Parameter | Posit Parameter |
|---|---|---|---|---|---|
| 15 mins. | 2 cores | (8, 0) | (16, 0) | (32, 0) | (64, 0) |
| 30 mins. | 4 cores | (8, 1) | (16, 1) | (32, 1) | (64, 1) |
| 45 mins. | 8 cores | (8, 2) | (16, 2) | (32, 2) | (64, 2) |
| 60 mins. | 16 cores | (8, 3) | (16, 3) | (32, 3) | (64, 3) |
| 90 mins. | 32 cores | (8, 4) | (16, 4) | (32, 4) | (64, 4) |

The non-limiting example parameters shown in Table 1 can include a processing time (e.g., an amount of time to be allotted for performance of the operation(s)), processing resources (e.g., an amount of processing resources to be allocated for performance of the operation(s)), and posit parameters (e.g., posit precision parameters such as a requested bit length and a requested exponent length of the bit strings with which the operation(s) are to be performed).

The processing time may, as indicated in Table 1, be selectable from various preset timeframes (e.g., 15 minutes, 30 minutes, 45 minutes, 60 minutes, 90 minutes). Because access to resources in multi-user network can be costly and can be based on an amount of time that access to the resources is provided, by allowing selectable timeframes within which an operation is to be completed, a user may be able to better plan expenses related to performing the operations described herein within a multi-user network. However, although specific timeframes are shown in Table 1, embodiments are not so limited, and additional processing time timeframes can be provided, or the processing time may be customizable (e.g., 20 minutes, 161.80339 minutes, etc.) via, for example, a user input.

The processing resource parameters may, as indicated in Table 1, be selectable from various preset processing resource parameters available to the multi-user network 201. For example, a number of processing cores (e.g., 2 cores, 4 cores, 8 cores, 16 cores, 32 cores, etc.) of the processing resources 245 to be allocated by the multi-user network 201 for performing the operation can be selected prior to initiation of the operation. Because access to resources in multi-user network can be costly and can be based on an amount of processing cores requested, by allowing selectable processing resources 245 with which an operation is to be completed, a user may be able to better plan expenses related to performing the operations described herein within a multi-user network. However, although specific processing resources are shown in Table 1, embodiments are not so limited, and additional processing resources can be provided, or the amount of processing resources requested may be customizable via, for example, a user input.

The posit parameters (e.g., a posit precision parameter) may, as indicated in Table 1, be selectable from various preset posit parameters (e.g., (8,0), (16,1), (32,4), etc.). The posit parameters shown in Table 1 can correspond to a bit length and an exponent bit length of a posit bit string to be used as an operand in performance of an arithmetic and/or logical operation. The bit length can correspond to the overall quantity of bits in the posit bit string, while the exponent bit length can correspond to a quantity of exponent bits (e.g., the exponent bits, es, described in more detail in connection with FIGS. 3 and 4A-4B, herein). In the notation of Table 1, a posit bit string with a bit length of eight bits and an exponent bit length of two bits can be written as (8,2), while a posit bit string with a bit length of sixty-four bits and an exponent bit length of four bits can be written as (64,4).

In some embodiments, the computing node 207 can be configured to display a graphical user interface (GUI) to facilitate performance of operations using bit strings using the host 202, the memory device 204, the FPGA 221, the ASIC 223, and/or the VCC 251. The computing node 207 can be configured to display a GUI in which a request to perform an operation and/or in which parameters that specify criterion under which the operations are to be performed are selected or otherwise input. For example, the GUI can resemble the example shown in Table 1 and can allow for a user to select a processing time, processing resources, and/or a posit parameter for use in an operation using posit bit strings as operands. Embodiments are not so limited, however, and the GUI of the computing node 207 can, in some embodiments, allow for a user to input specific parameters or values for parameters that are not necessarily enumerated in Table 1.

As shown in FIG. 2B, the host 202 can be coupled to the memory device 204 via channel(s) 203, which can be analogous to the channel(s) 103 illustrated in FIG. 1. The field programmable gate array (FPGA) 221 can be coupled to the host 202 via channel(s) 217 and the application-specific integrated circuit (ASIC) 223 can be coupled to the host 202 via channel(s) 219. In some embodiments, the channel(s) 217 and/or the channel(s) 219 can include a peripheral serial interconnect express (PCIe) interface, however, embodiments are not so limited, and the channel(s) 217 and/or the channel(s) 219 can include other types of interfaces, buses, communication channels, etc. to facilitate transfer of data between the host 202 and the FPGA 221 and/or the ASIC 223. For example, the channels 203, 217, and/or 219 can be communication paths that can utilize multi-user network communication 201 protocols such as TCP/IP, MQTT, HTTP, etc.

In some embodiments, the FPGA 221 and/or the ASIC 223 can receive bit strings, convert the bit strings from a first format (e.g., a floating-point format) to a second format (e.g., a posit format), perform arithmetic and/or logical operations on the posit bit strings to produce resultant posit bit strings that represents a result of the operation performed on the received posit bit strings, and/or convert the resultant bit strings from the second format to the first format based on parameters such as those shown in Table 1.

As described above, non-limiting examples of arithmetic and/or logical operations that can be performed by the FPGA 221 and/or the ASIC 223 include arithmetic operations such as addition, subtraction, multiplication, division, fused multiply addition, multiply-accumulate, dot product units, greater than or less than, absolute value (e.g., FABS( ), fast Fourier transforms, inverse fast Fourier transforms, sigmoid function, convolution, square root, exponent, and/or logarithm operations, and/or logical operations such as AND, OR, XOR, NOT, etc., as well as trigonometric operations such as sine, cosine, tangent, etc. using the posit bit strings.

The FPGA 221 can include a state machine 227 and/or register(s) 229. The state machine 227 can include one or more processing devices that are configured to perform operations on an input and produce an output. The FPGA 221 can, in some embodiments, receive a command (e.g., from the computing node 207) to initiate performance of an operation using one or more bit strings. The command can include one or more parameters, such as the parameters shown in Table 1.

For example, the FPGA 221 can be configured to receive bit strings, convert the bit strings from a first format (e.g., a floating-point format) to a second format (e.g., a posit format), perform arithmetic and/or logical operations on the posit bit strings to produce resultant posit bit strings that represents a result of the operation performed on the received posit bit strings, and/or convert the resultant bit strings from the second format to the first format based on the parameters received with the command to initiate the operations.

The register(s) 229 of the FPGA 221 can be configured to buffer and/or store the bit strings prior to the state machine 227 performing an operation on the received posit bit strings. In addition, the register(s) 229 of the FPGA 221 can be configured to buffer and/or store a resultant posit bit string that represents a result of the operation performed on the received posit bit strings prior to transferring the result to circuitry external to the ASIC 233, such as the host 202, the memory device 204, the computing node 207, the memory resource(s) 247, etc.

The ASIC 223 can include logic 241 and/or a cache 243. The logic 241 can include circuitry configured to perform operations on an input and produce an output. The ASIC 223 can, in some embodiments, receive a command (e.g., from the computing node 207) to initiate performance of an operation using one or more bit strings. The command can include one or more parameters, such as the parameters shown in Table 1.

In some embodiments, the ASIC 223 can be configured to receive bit strings, convert the bit strings from a first format (e.g., a floating-point format) to a second format (e.g., a posit format), perform arithmetic and/or logical operations on the posit bit strings to produce resultant posit bit strings that represents a result of the operation performed on the received posit bit strings, and/or convert the resultant bit strings from the second format to the first format based on the parameters received with the command to initiate the operations.

The cache 243 of the ASIC 223 can be configured to buffer and/or store the posit bit strings prior to the logic 241 performing an operation on the received posit bit strings. In addition, the cache 243 of the ASIC 223 can be configured to buffer and/or store a resultant posit bit string that represents a result of the operation performed on the received posit bit strings prior to transferring the result to circuitry external to the ASIC 233, such as the host 202, the memory device 204, the computing node 207, the memory resource(s) 247, etc.

Although the FPGA 227 is shown as including a state machine 227 and register(s) 229, in some embodiments, the FPGA 221 can include logic, such as the logic 241, and/or a cache, such as the cache 243 in addition to, or in lieu of, the state machine 227 and/or the register(s) 229. Similarly, the ASIC 223 can, in some embodiments, include a state machine, such as the state machine 227, and/or register(s), such as the register(s) 229 in addition to, or in lieu of, the logic 241 and/or the cache 243.

The VCC 251 can include a scheduling agent, a plurality of virtual computing instances (VCIs) and/or hypervisors, which are described in more detail in connection with FIGS. 6 and 7A-7B, herein. The VCC 251 can be communicatively coupled to the host 202, the memory device 204, the FPGA 221, and/or the ASIC 223 of the multi-user network 201, and/or the VCC 251 can be communicatively coupled to the computing node 207. As described in more detail in connection with FIGS. 7A and 7B, the VCC 251 can facilitate performance of operations to convert bit strings between various formats and/or the VCC 251 can facilitate performance of arithmetic and/or logical operations using the bit strings. For example, the VCIs (or the hypervisors) of the VCC 251 can have a posit operation agent running thereon that can facilitate performance of operations to convert bit strings between various formats and/or the performance of arithmetic and/or logical operations using the bit strings.

An agent may be a set of instructions, code, or script in software, firm, or hardware, or some combination of the three, resident on a computer or computing device. The agent may communication regularly or periodically with another device or program. The agent may act (e.g., monitor activity, execute commands, access memory or storage) with or without express commands. In some examples, the agent is an autonomous agent. For example, an agent can be configured to execute instructions using computing resources, such as hardware, that can be available to the agent in the pool of computing resources (e.g., the pool of shared computing resources 246 illustrated in FIG. 2B).

In some embodiments, circuitry (e.g., the logic circuitry 122 illustrated in FIG. 1, the acceleration circuitry 220 illustrated in FIG. 2A, the FPGA 221, and/or the ASIC 223) can be configured to receive a request to perform an arithmetic operation and/or a logical operation using at least one posit bit string operand. The request can include at least one of the parameters described above in connection with Table 1. In some embodiments, the request can be received by the circuitry from the computing node 207. The circuitry can, in response to the request, perform the arithmetic operation and/or the logical operation using the posit bit string operand based, at least in part, on the received parameter.

For example, if the parameter specifies an amount of computing resources (e.g., an amount of processing resources and/or an amount of memory resources) from a pool of shared computing resources 246 available to the multi-user network 201, the circuitry can be configured to access and allocate the amount of computing resources specified by the parameter for use in performance of the arithmetic operation and/or the logical operation using the at least one posit bit string operand. The circuitry can, in some embodiments, generate a request to the multi-user network 201 to allocate the specified amount of computing resources for use in performance of the arithmetic operation and/or the logical operation using the at least one posit bit string operand to access the specified amount of computing resources.

In another example, if the parameter specifies an amount of time (e.g., a particular amount of time) allowed for performance of the arithmetic operation and/or the logical operation using the at least one posit bit string operand, the circuitry can be configured to perform the operation within the amount of time specified by the parameter. In some embodiments, the parameter can specify a posit parameter (e.g., a posit precision parameter), as describe above in connection with Table 1. In embodiments in which the parameter specifies a posit parameter, the circuitry can be configured to generate the posit bit string operand such that a bit length and/or an exponent bit length of the posit operand correspond to the bit length and/or the exponent bit length specified by the parameter. The circuitry can then perform the arithmetic and/or logical operation using the posit bit string operand based on the specified parameter(s).

In some embodiments, the circuitry can retrieve the posit bit string operand from a memory location within the pool of shared computing resources 246 prior to performance of the arithmetic operation and/or the logical operation. For example, if the posit bit string operand is stored in the memory device 204 (or another memory resource, such as the memory resource(s) 247 accessible by the multi-user network 201), the circuitry can generate a request for the posit bit string operand and retrieve the posit bit string operand from the memory location in which it is stored prior to performance of the arithmetic and/or logical operation. If the bit string operand is not already in the posit format (e.g., if the bit string operand is stored in a memory location accessible to the multi-user network 201 in a different format such as a floating-point format), the circuitry can perform an operation to convert the bit string to a posit bit string prior to performance of the arithmetic and/or logical operation.

Figure 3:
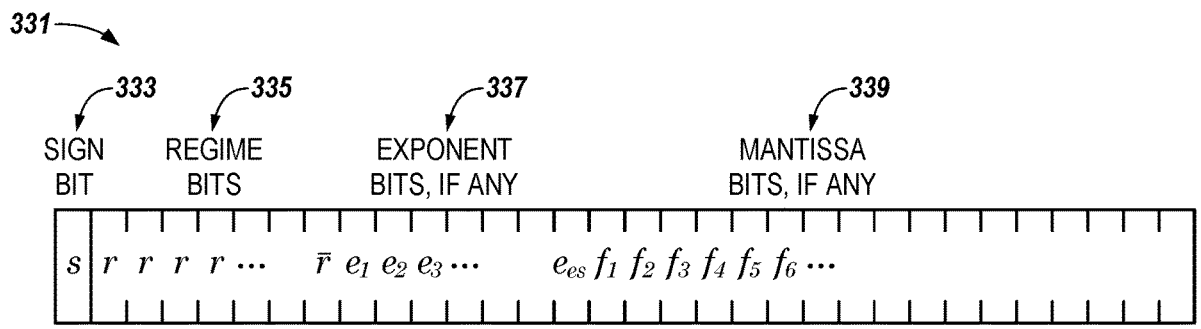
FIG. 3 is an example of an n-bit post with es exponent bits.

FIG. 3 is an example of an n-bit universal number, or "unum" with es exponent bits. In the example of FIG. 3, the n-bit unum is a posit bit string 331. As shown in FIG. 3, the n-bit posit 331 can include a set of sign bit(s) (e.g., a sign bit 333), a set of regime bits (e.g., the regime bits 335), a set of exponent bits (e.g., the exponent bits 337), and a set of mantissa bits (e.g., the mantissa bits 339). The mantissa bits 339 can be referred to in the alternative as a "fraction portion" or as "fraction bits," and can represent a portion of a bit string (e.g., a number) that follows a decimal point.

The sign bit 333 can be zero (0) for positive numbers and one (1) for negative numbers. The regime bits 335 are described in connection with Table 2, below, which shows (binary) bit strings and their related numerical meaning, k. In Table 2, the numerical meaning, k, is determined by the run length of the bit string. The letter x in the binary portion of Table 2 indicates that the bit value is irrelevant for determination of the regime, because the (binary) bit string is terminated in response to successive bit flips or when the end of the bit string is reached. For example, in the (binary) bit string 0010, the bit string terminates in response to a zero flipping to a one and then back to a zero. Accordingly, the last zero is irrelevant with respect to the regime and all that is considered for the regime are the leading identical bits and the first opposite bit that terminates the bit string (if the bit string includes such bits).

TABLE 2

| Binary | 0000 | 0001 | 001X | 01XX | 10XX | 110X | 1110 | 1111 |
|---|---|---|---|---|---|---|---|---|
| Numerical (k) | −4 | −3 | −2 | −1 | 0 | 1 | 2 | 3 |

In FIG. 3, the regime bits 335 r correspond to identical bits in the bit string, while the regime bits 335 $\bar{r}$ correspond to an opposite bit that terminates the bit string. For example, for the numerical k value −2 shown in Table 2, the regime bits r correspond to the first two leading zeros, while the regime bit(s) $\bar{r}$ correspond to the one. As noted above, the final bit corresponding to the numerical k, which is represented by the X in Table 2 is irrelevant to the regime.

If m corresponds to the number of identical bits in the bit string, if the bits are zero, k=−m. If the bits are one, then k=m−1. This is illustrated in Table 1 where, for example, the (binary) bit string 10XX has a single one and k=m−1=1−1=0. Similarly, the (binary) bit string 0001 includes three zeros so k=−m=−3. The regime can indicate a scale factor of useed$^k$, where useed=$2^{2^{es}}$. Several example values for used are shown below in Table 3.

TABLE 3

| | | | es | | |
|---|---|---|---|---|---|
| | 0 | 1 | 2 | 3 | 4 |
| used | 2 | $2^2 = 4$ | $4^2 = 16$ | $16^2 = 256$ | $256^2 = 65536$ |

The exponent bits 337 correspond to an exponent e, as an unsigned number. In contrast to floating-point numbers, the exponent bits 337 described herein may not have a bias associated therewith. As a result, the exponent bits 337 described herein may represent a scaling by a factor of $2^e$. As shown in FIG. 3, there can be up to es exponent bits ($e_1$, $e_2$, $e_3$, ... $e_{es}$), depending on how many bits remain to right of the regime bits 335 of the n-bit posit 331. In some embodiments, this can allow for tapered accuracy of the n-bit posit 331 in which numbers which are nearer in magnitude to one have a higher accuracy than numbers which are very large or very small. However, as very large or very small numbers may be utilized less frequent in certain kinds of operations, the tapered accuracy behavior of the n-bit posit 331 shown in FIG. 3 may be desirable in a wide range of situations.

The mantissa bits 339 (or fraction bits) represent any additional bits that may be part of the n-bit posit 331 that lie to the right of the exponent bits 337. Similar to floating-point bit strings, the mantissa bits 339 represent a fraction $f$, which can be analogous to the fraction 1.$f$ where $f$ includes one or more bits to the right of the decimal point following the one. In contrast to floating-point bit strings, however, in the n-bit posit 331 shown in FIG. 3, the "hidden bit" (e.g., the one) may always be one (e.g., unity), whereas floating-point bit strings may include a subnormal number with a "hidden bit" of zero (e.g., .$f$).

Figure 4A:
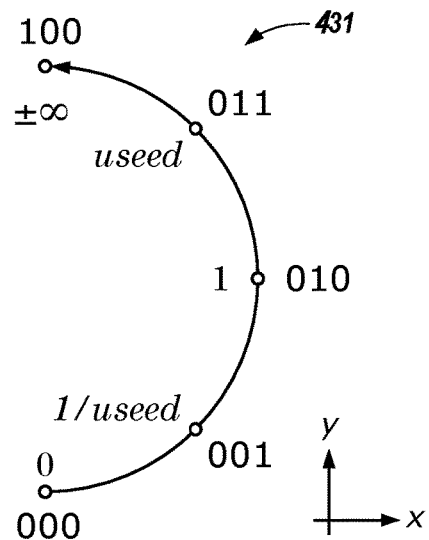
FIG. 4A is an example of positive values for a 3-bit posit.

FIG. 4A is an example of positive values for a 3-bit posit 431. In FIG. 4A, only the right half of projective real numbers, however, it will be appreciated that negative projective real numbers that correspond to their positive counterparts shown in FIG. 4A can exist on a curve representing a transformation about they-axis of the curves shown in FIG. 4A.

In the example of FIG. 4A, es=2, so useed=$2^{2^{es}}$=16. The precision of a posit 431 can be increased by appending bits the bit string, as shown in FIG. 4B. For example, appending a bit with a value of one (1) to bit strings of the posit 431 increases the accuracy of the posit 431 as shown by the posit 431-2 in FIG. 4B. Similarly, appending a bit with a value of one to bit strings of the posit 431-2 in FIG. 4B increases the accuracy of the posit 431-2 as shown by the posit 431-3 shown in FIG. 4B. An example of interpolation rules that may be used to append bits to the bits strings of the posits 431 shown in FIG. 4A to obtain the posits 431-2, 431-3 illustrated in FIG. 4B follow.

Figure 4B:
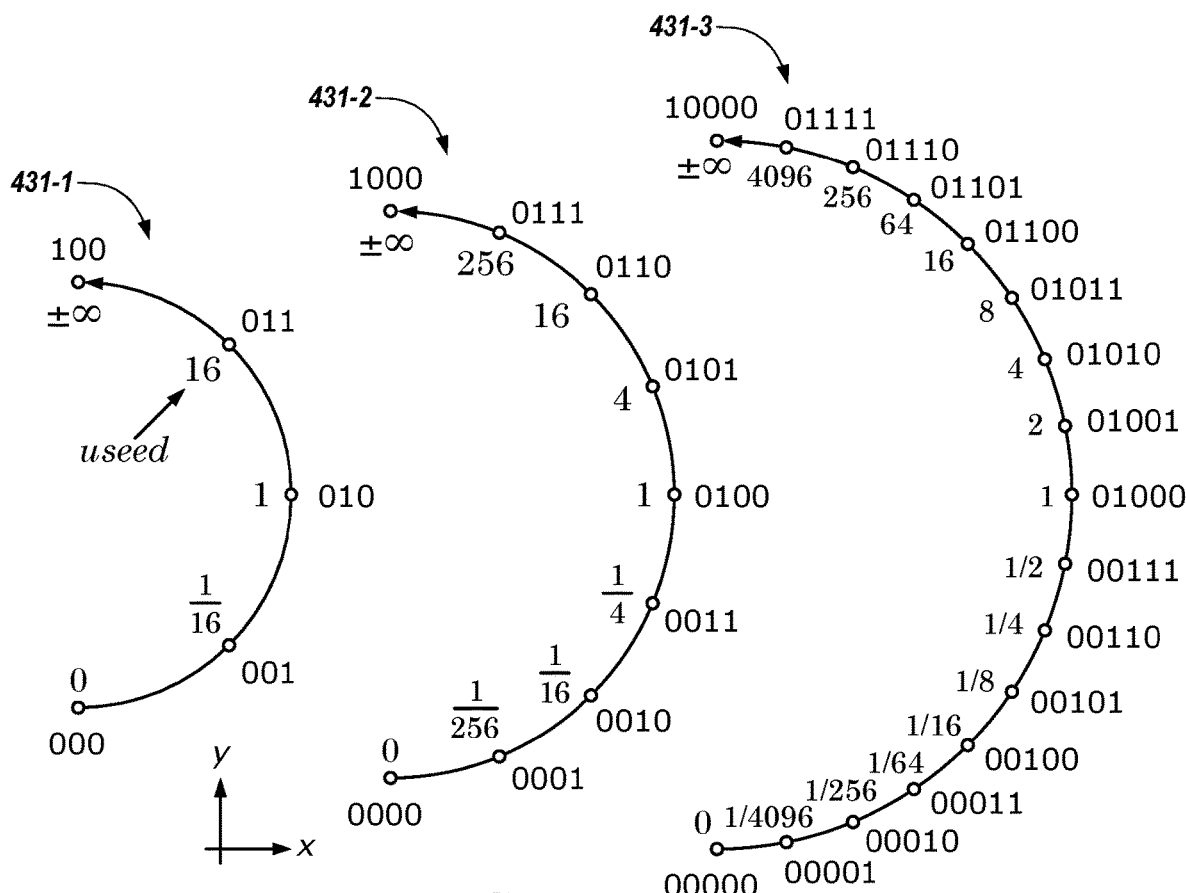
FIG. 4B is an example of posit construction using two exponent bits.

If maxpos is the largest positive value of a bit string of the posits 431-1, 431-2, 431-3 shown in FIG. 4B, and minpos is the smallest value of a bit string of the posits 431-1, 431-2, 431-3, maxpos may be equivalent to useed and minpos may be equivalent to $$\frac{1}{useed}.$$

Between maxpos and ±∞, a new bit value may be maxpos*useed, and between zero and minpos, a new bit value may be $$\frac{minpos}{useed}.$$

These new bit values can correspond to a new regime bit 335. Between existing values $x=2^m$ and $y=2^n$, where m and n differ by more than one, the new bit value may be given by the geometric mean:

$$\sqrt{x \times y} = 2^{\frac{(m+n)}{2}},$$

which corresponds to a new exponent bit 337. If the new bit value is midway between the existing x and y values next to it, the new bit value can represent the arithmetic mean $$\frac{x+y}{2},$$

which corresponds to a new mantissa bit 339.

FIG. 4B is an example of posit construction using two exponent bits. In FIG. 4B, only the right half of projective real numbers, however, it will be appreciated that negative projective real numbers that correspond to their positive counterparts shown in FIG. 4B can exist on a curve representing a transformation about the y-axis of the curves shown in FIG. 4B. The posits 431-1, 431-2, 431-3 shown in FIG. 4B each include only two exception values: Zero (0) when all the bits of the bit string are zero and ±∞ when the bit string is a one (1) followed by all zeros. It is noted that the numerical values of the posits 431-1, 431-2, 431-3 shown in FIG. 4 are exactly $useed^k$. That is, the numerical values of the posits 431-1, 431-2, 431-3 shown in FIG. 4 are exactly useed to the power of the k value represented by the regime (e.g., the regime bits 335 described above in connection with FIG. 3). In FIG. 4B, the posit 431-1 has es=2, so useed=$2^{2^{es}}$=16, the posit 431-2 has es=3, so useed=$2^{2^{es}}$=256, and the posit 431-3 has es=4, so useed=$2^{2^{es}}$=4096.

As an illustrative example of adding bits to the 3-bit posit 431-1 to create the 4-bit posit 431-2 of FIG. 4B, the useed=256, so the bit string corresponding to the useed of 256 has an additional regime bit appended thereto and the former useed, 16, has a terminating regime bit (r) appended thereto. As described above, between existing values, the corresponding bit strings have an additional exponent bit appended thereto. For example, the numerical values ¹⁄₁₆, ¼, 1, and 4 will have an exponent bit appended thereto. That is, the final one corresponding to the numerical value 4 is an exponent bit, the final zero corresponding to the numerical value 1 is an exponent bit, etc. This pattern can be further seen in the posit 431-3, which is a 5-bit posit generated according to the rules above from the 4-bit posit 431-2. If another bit was added to the posit 431-3 in FIG. 4B to generate a 6-bit posit, mantissa bits 339 would be appended to the numerical values between ¹⁄₁₆ and 16.

A non-limiting example of decoding a posit (e.g., a posit 431) to obtain its numerical equivalent follows. In some embodiments, the bit string corresponding to a posit p is an unsigned integer ranging from $-2^{n-1}$ to $2^{n-1}$, k is an integer corresponding to the regime bits 335 and e is an unsigned integer corresponding to the exponent bits 337. If the set of mantissa bits 339 is represented as $\{f_1 f_2 \ldots f_{fs}\}$ and $f$ is a value represented by $1. f_1 f_2 \ldots f_{fs}$ (e.g., by a one followed by a decimal point followed by the mantissa bits 339), the p can be given by Equation 1, below.

$$x = \begin{cases} 0, & p = 0 \\ \pm\infty, & p = -2^{n-1} \\ \text{sign}(p) \times useed^k \times 2^e \times f, & \text{all other } p \end{cases} \quad \text{Equation 1}$$

A further illustrative example of decoding a posit bit string is provided below in connection with the posit bit string 0000110111011101 shown in Table 4, below follows.

TABLE 4

| SIGN | REGIME | EXPONENT | MANTISSA |
|---|---|---|---|
| 0 | 0001 | 101 | 11011101 |

In Table 4, the posit bit string 0000110111011101 is broken up into its constituent sets of bits (e.g., the sign bit 333, the regime bits 335, the exponent bits 337, and the mantissa bits 339). Since es=3 in the posit bit string shown in Table 4 (e.g., because there are three exponent bits), useed =256. Because the sign bit 333 is zero, the value of the numerical expression corresponding to the posit bit string shown in Table 4 is positive. The regime bits 335 have a run of three consecutive zeros corresponding to a value of −3 (as described above in connection with Table 2). As a result, the scale factor contributed by the regime bits 335 is 256-3 (e.g., $useed^k$). The exponent bits 337 represent five (5) as an unsigned integer and therefore contribute an additional scale factor of $2^e=2^5=32$. Lastly, the mantissa bits 339, which are given in Table 4 as 11011101, represent two-hundred and twenty-one (221) as an unsigned integer, so the mantissa bits 339, given above as $f$ are $$f + \frac{221}{256}.$$

Using these values and Equation 1, the numerical value corresponding to the posit bit string given in Table 4 is $$+256^{-3} \times 2^5 \times \left(1 + \frac{221}{256}\right) = \frac{437}{134217728} \approx 3.55393 \times 10^{-6}.$$

Figure 5:
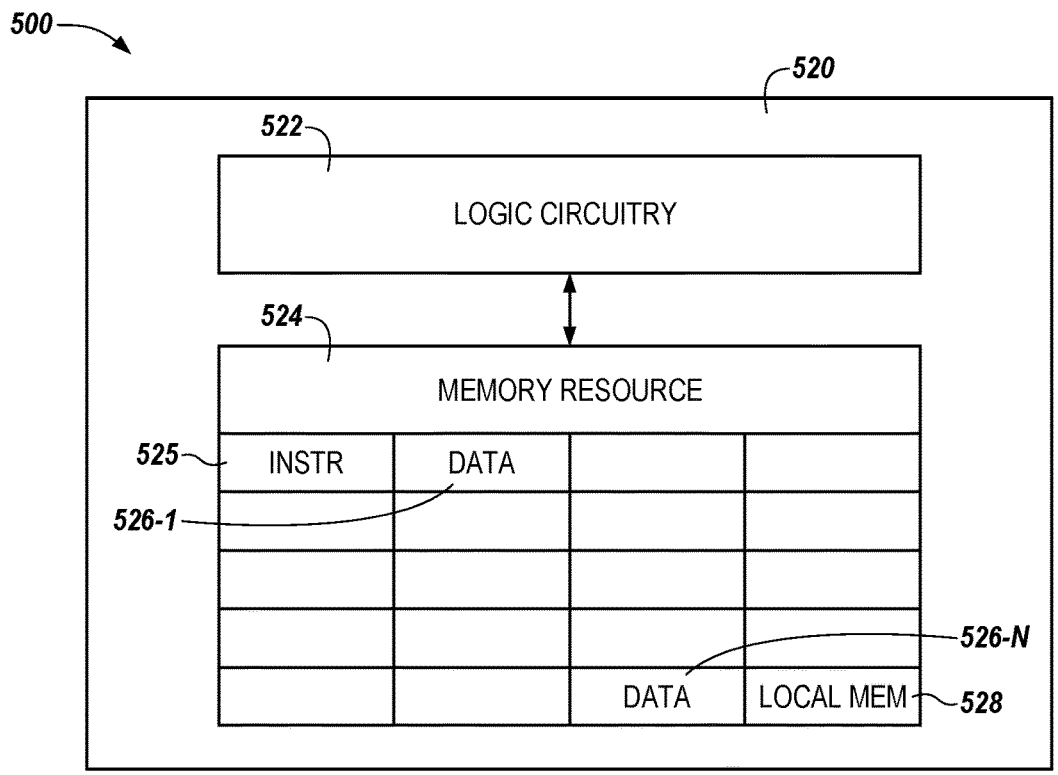
FIG. 5 is a functional block diagram in the form of acceleration circuitry in accordance with a number of embodiments of the present disclosure.

FIG. 5 is a functional block diagram in the form of an apparatus 500 including acceleration circuitry 520 in accordance with a number of embodiments of the present disclosure. The acceleration circuitry 520 can include logic circuitry 522 and a memory resource 524, which can be analogous to the logic circuitry 122/222 and the memory resource 124/224 illustrated in FIGS. 1 and 2, herein. The logic circuitry 522 and/or the memory resource 524 can separately be considered an "apparatus."

The acceleration circuitry 520 can be configured to receive a command (e.g., an initiation command) from a host (e.g., the host 102/202 illustrated in FIGS. 1 and 2, herein) and/or a controller (e.g., the controller 210 illustrated in FIG. 2, herein) to initiate performance of one or more operations (e.g., format conversion operations, arithmetic operations, logical operations, bitwise operations, etc.) on data stored in the memory resource 524. Once the initiation command has been received by the acceleration circuitry 520, the acceleration circuitry can perform the operations described above in the absence of intervening commands from the host and/or the controller. For example, the acceleration circuitry 520 can include sufficient processing resources and/or instructions to perform operations on the bit strings stored in the memory resource 524 without receiving additional commands from circuitry external to the acceleration circuitry 520.

The logic circuitry 522 can be an arithmetic logic unit (ALU), a state machine, sequencer, controller, an instruction set architecture, or other type of control circuitry. As described above, an ALU can include circuitry to perform operations (e.g., operations to convert a bit string from a first format (a floating-point format) to a second format (a posit format) and/or arithmetic operations, logical operations, bitwise operations, etc.) such as the operations described above, on integer binary numbers, such as bit strings in the posit format. An instruction set architecture (ISA) can include a reduced instruction set computing (RISC) device. In embodiments in which the logic circuitry 522 includes a RISC device, the RISC device can include a processing resource that can employ an instruction set architecture (ISA) such as a RISC-V ISA, however, embodiments are not limited to RISC-V ISAs and other processing devices and/or ISAs can be used.

In some embodiments, the logic circuitry 522 can be configured to execute instructions (e.g., instructions stored in the INSTR 525 portion of the memory resource 524) to perform the operations above. For example, the logic circuitry 524 is provisioned with sufficient processing resources to cause performance of such operations on the data (e.g., on bit strings) received by the acceleration circuitry 520.

Once the operation(s) are performed by the logic circuitry 522, the resultant bit strings can be stored in the memory resource 524 and/or a memory array (e.g., the memory array 230 illustrated in FIG. 2, herein). The stored resultant bit strings can be addressed such that it is accessible for performance of the operations. For example, the bit strings can be stored in the memory resource 524 and/or the memory array at particular physical addresses (which may have corresponding logical addresses corresponding thereto) such that the bit strings can be accessed in performing the operations.

The memory resource 524 can, in some embodiments, be a memory resource such as random-access memory (e.g., RAM, SRAM, etc.). Embodiments are not so limited, however, and the memory resource 524 can include various registers, caches, buffers, and/or memory arrays (e.g., 1T1C, 2T2C, 3T, etc. DRAM arrays). The memory resource 524 can be configured to receive a bit string(s) from, for example, a host such as the host 102/202 illustrated in FIGS. 1 and 2 and/or a memory array such as the memory array 130/230 illustrated in FIGS. 1 and 2, herein. In some embodiments, the memory resource 538 can have a size of approximately 256 kilobytes (KB), however, embodiments are not limited to this particular size, and the memory resource 524 can have a size greater than, or less than, 256 KB.

The memory resource 524 can be partitioned into one or more addressable memory regions. As shown in FIG. 5, the memory resource 524 can be partitioned into addressable memory regions so that various types of data can be stored therein. For example, one or more memory regions can store instructions ("INSTR") 525 used by the memory resource 524, one or more memory regions can store data 526-1, . . . 526-N (e.g., data such as a bit string retrieved from the host and/or the memory array), and/or one or more memory regions can serve as a local memory ("LOCAL MEM.") 528 portion of the memory resource 538. Although 20 distinct memory regions are shown in FIG. 5, it will be appreciated that the memory resource 524 can be partitioned into any number of distinct memory regions.

As discussed above, the bit string(s) can be retrieved from the host and/or memory array in response to messages and/or commands generated by the host, a controller (e.g., the controller 210 illustrated in FIG. 2, herein), or the logic circuitry 522. In some embodiments, the commands and/or messages can be processed by the logic circuitry 522. Once the bit string(s) are received by the acceleration circuitry 520 and stored in the memory resource 524, they can be processed by the logic circuitry 522. Processing the bit string(s) by the logic circuitry 522 can include converting the bit string(s) from a first format to a second format, performing arithmetic operations and/or logical operations on the converted bit string(s), and/or converting the bit string(s) that have been operated upon from the second format to the first format.

In a non-limiting neural network training application, the acceleration circuitry 520 can convert a floating-point bit string into an 8-bit posit with es=0. In contrast to some approaches that utilize a half-precision 16-bit floating-point bit string for neural network training, an 8-bit posit bit string with es=0 can provide comparable neural network training results two to four times faster than the half-precision 16-bit floating-point bit string.

A common function used in training neural networks is a sigmoid function $f(x)$ (e.g., a function that asymptotically approaches zero as $x \to \infty$ and asymptotically approaches 1 as $x \to \infty$). An example of a sigmoid function that may be used in neural network training applications is $$\frac{1}{1+e^{-x}},$$

which can require upwards of one-hundred clock cycles to compute using half-precision 16-bit floating-point bit strings. However, using an 8-bit posit with es=0, the same function can be evaluated by the acceleration circuitry 520 by flipping the first bit of the posit representing x and shifting two bits to the right—operations that may take at least an order of magnitude fewer clock signals in comparison to evaluation of the same function using a half-precision 16-bit floating-point bit string.

In this example, by operating the acceleration circuitry 520 to convert a floating-point bit string into an 8-bit posit bit string with es=0 and then subsequently operating the acceleration circuitry 520 to perform the operation to evaluate the example sigmoid function on the 8-bit posit bit string, processing time, resource consumption, and/or storage space can be reduced in comparison to approaches that do not include acceleration circuitry 520 configured to perform such conversion and/or subsequent operations. This reduction in processing time, resource consumption, and/or storage space can improve the function of a computing device in which the acceleration circuitry 520 is operating by reducing the number of clock signals used in performing such operations, which may reduce an amount of power consumed by the computing device and/or an amount of time to perform such operations, as well as by freeing up processing and/or memory resources for other tasks and functions.

Figure 6:
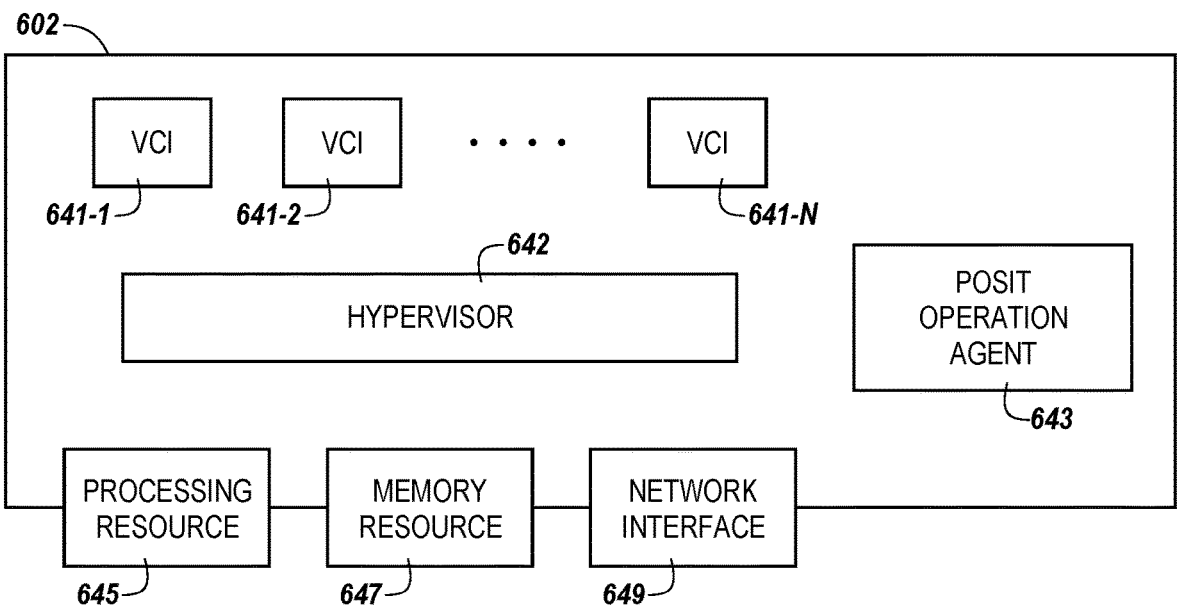
FIG. 6 is a diagram of a host, a hypervisor, a plurality of virtual computing instances, and an agent in accordance with a number of embodiments of the present disclosure.

FIG. 6 is a diagram of a host 602, a hypervisor 642, a plurality of virtual computing instances (VCIs) 641-1, 641-2, . . . 641-N, and a posit operation agent 643 in accordance with a number of embodiments of the present disclosure. The system can include a host 602 with processing resource(s) 645 (e.g., one or more processors), memory resource(s) 647 (e.g., one or more main memory devices, such as the memory device 204 illustrated in FIGS. 2A and 2B, herein) and/or storage memory devices), and/or a network interface 649. The host 602 can be included in a multi-user network, such as the multi-user network 201 illustrated in FIG. 2B. A multi-user network can extend virtualization concepts such as abstraction, pooling, and automation to data center resources and services to provide information technology as a service (ITaaS). In a multi-user network, infrastructure, such as networking, processing, and security, can be virtualized and delivered as a service. A multi-user network can include software defined networking and/or software defined storage. In some embodiments, components of a multi-user network can be provisioned, operated, and/or managed through an application programming interface (API).

The host 602 can incorporate a hypervisor 642 that can execute a number of VCIs 641-1, 641-2, . . . , 641-N (referred to generally herein as "VCIs 641"). The VCIs can be provisioned with processing resources 645 and/or memory resources 647 and can communicate via the network interface 649. The processing resources 647 and the memory resources 647 provisioned to the VCIs 641 can be local and/or remote to the host 602 (e.g., the VCIs 641 can be ultimately executed by hardware that may not be physically tied to the VCIs 641). For example, in a multi-user network, the VCIs 641 can be provisioned with resources that are generally available to the multi-user network and are not tied to any particular hardware device. By way of example, the memory resources 647 can include volatile and/or non-volatile memory available to the VCIs 647. The VCIs 641 can be moved to different hosts (not specifically illustrated), such that a different hypervisor manages the VCIs 641. In some embodiments, the host 602 can be connected to (e.g., in communication with) a posit operation agent 643, which can be deployed on a VCI 641 or container (not explicitly shown).

The VCIs 641 can include one or more containers, which can have a containerized workload running thereon. The containerized workloads can correspond to one or more applications or portions of applications executed by the VCIs 641 and/or the host 602. The application may be configured to perform certain tasks and/or functions for the VCIs 641 and/or the host 602, such as converting bit strings between various formats and performance of arithmetic and/or logical operations using posit bit strings. By executing the application using multiple containerized workloads, scalability and/or portability of applications may be improved in comparison to approaches in which applications are monolithic.

The posit operation agent 643 can be configured to cause operations, such as operations to convert bit strings between various formats and/or operations to perform arithmetic and/or logical operations on the bit strings, as described in more detail, herein. In some embodiments, the posit operation agent 643 can be deployed on (e.g., may be running on) the host 602, and/or one or more of the VCIs 641.

In some embodiments, the posit operation agent 643 can include a combination of software and hardware, or the posit operation agent 643 can include software and can be provisioned by the processing resource 645. An example of the posit operation agent 643 is illustrated and described in more detail with respect to FIGS. 7A and 7B, herein. In some embodiments, the operations performed by the posit operation agent 643 can be scheduled by a container scheduling agent (e.g., the scheduling agent 742 illustrated in FIGS. 7A and 7B, herein) such as KUBERNETES®, DOCKER SWARM®, MESOS®, etc.

The posit operation agent 643 can be deployed in a multi-user network, such as the multi-user network 201 illustrated in FIG. 2B, herein. The posit operation agent 643 can be configured to receive a parameter corresponding to performance of at least one of an arithmetic operation and a logical operation using one or more posit bit strings. The parameter can be at least one of the parameters described above in connection with Table 1. For example, the parameter can include a processing time parameter, a parameter corresponding to an amount of processing resources to perform the operation using the one or more posit bit strings, a parameter corresponding to a bit length of the one or more posit bit strings, a parameter corresponding to a quantity of exponent bits of the one or more posit bit strings, or combinations thereof.

The posit operation agent 643 can be configured allocate, based on the parameter, computing resources available to the multi-user network to be used in performance of the arithmetic operation and/or the logical operation using the one or more posit bit strings. For example, the posit operation agent 643 can be configured to allocate an amount of time available to perform the arithmetic and/or logical operation, an amount of processing resources available to perform the arithmetic and/or logical operation, a bit length of the posit bit string with which the arithmetic and/or logical operation will be performed, and/or an exponent length of the posit bit string with which the arithmetic and/or logical operation will be performed.

In some embodiments, the posit operation agent 643 can receive a request to initiate performance of an arithmetic operation and/or a logical operation using the one or more posit bit strings and/or cause performance of the arithmetic operation and/or the logical operation using the one or more posit bit strings based, at least in part, on the received parameter. For example, the posit operation agent 643 can access circuitry such as the logic circuitry 122 illustrated in FIG. 1, the FPGA 221 and/or the ASIC 223 illustrated in Figured 2B to perform the arithmetic operation and/or the logical operation using the one or more posit bit strings. The request and/or the parameter can be received from a computing node, such as the computing node 207 illustrated in FIG. 2B, herein.

If the bit strings that will be used in performance of the arithmetic and/or logical operation are stored in a repository of the multi-user network (e.g., the memory device 204 or the memory resource(s) 247 illustrated in FIG. 2B, or other data store or data repository associated with the multi-user network), the posit operation agent 643 can be configured to retrieve the one or more posit bit strings from the accessible by the multi-user network prior to causing performance of the arithmetic operation and/or the logical operation using the one or more posit bit strings.

In some embodiments, the bit strings may be stored according to a format other than a posit format. For example, the bit strings may be stored in the floating-point format. If the bit strings requested for performance of the arithmetic and/or logical operation are stored in a different than a posit format, the posit operation agent 643 may be configured to perform (or cause performance of using, for example the logic circuitry 122 illustrated in FIG. 1, the FPGA 221 and/or the ASIC 223 illustrated in Figured 2B) an operation to convert the bit strings to the posit format prior to performance of the arithmetic operation and/or the logical operation.

Figure 7A:
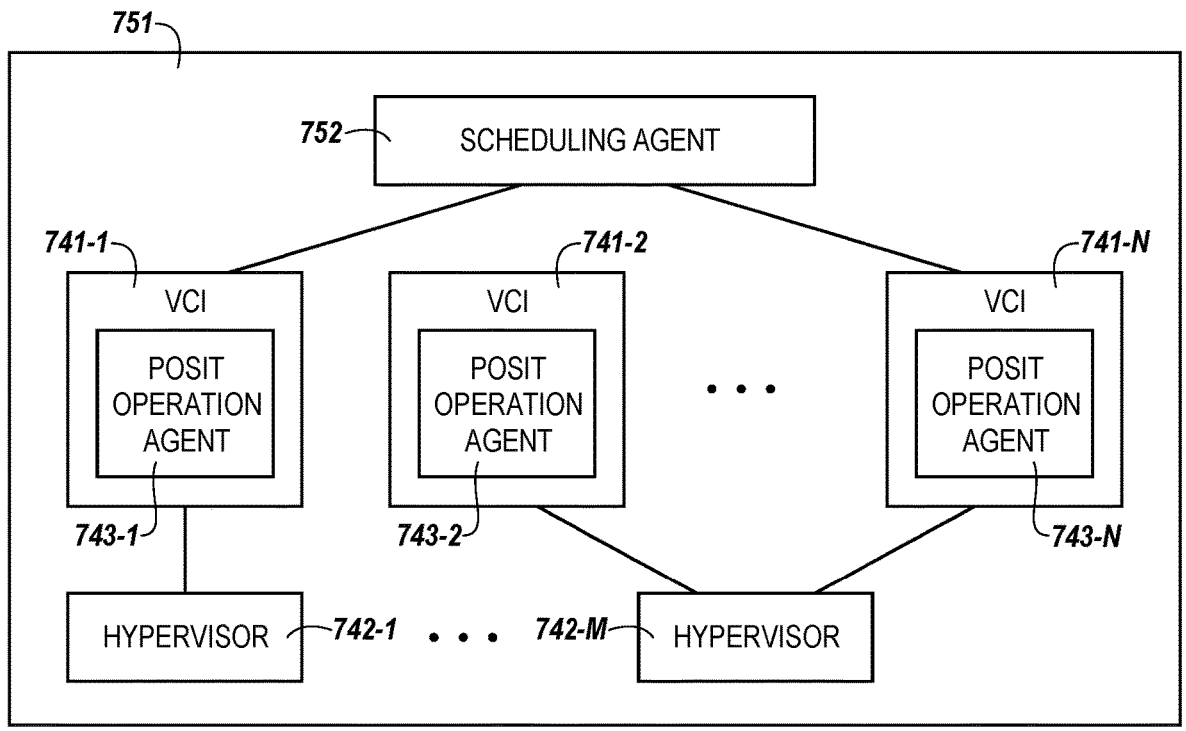
FIG. 7A is a diagram of a virtual computing cluster in accordance with a number of embodiments of the present disclosure.

FIG. 7A is a diagram of a virtual computing cluster (VCC) 751 in accordance with a number of embodiments of the present disclosure. The VCC 751, which can be analogous to the VCC 251 illustrated in FIG. 2B, can be deployed in a multi-user network such as the multi-user network 201 illustrated in FIG. 2B, herein. As shown in FIG. 7A, the cluster 751 (e.g., the VCC) can include a plurality of virtual computing instances (VCIs) 741 provisioned with a pool of computing resources (e.g., the pool of shared computing resources 246 illustrated in FIG. 2B) and executable by hardware. In some embodiments, at least a first VCI (e.g., the VCI 741-1) is deployed on a first hypervisor (e.g., the hypervisor 742-1) of the VCC 751 and at least a second VCI (e.g., the VCI 741-2) is deployed on a second hypervisor (e.g., the hypervisor 742-M) of the VCC 751. Although not explicitly shown, in some embodiments, the VCIs 741 can include containers running thereon.

The VCIs 741 can include respective posit operation agents 743. For example, a first posit operation agent 743-1 can be deployed on a first VCI 741-1, a second posit operation agent 743-2 can be deployed on a second VCI 741-2, and an $N^{th}$ posit operation agent 743-N can be deployed on a $N^{th}$ VCI 741-N. As described above, the posit operation agents 743 can be configured to perform or cause performance of operations such as converting bit strings between various formats, as well as arithmetic and/or logical operations using converted (e.g., posit) bit strings. In some embodiments, the posit operation agent(s) can be provided as a posit operation engine and/or a posit operation module, as described in more detail in connection with FIGS. 8 and 9, herein.

The scheduling agent 752 can be provisioned with computing resources and can be configured to orchestrate deployment of VCIs 741 and/or containers within the VCC 751. In some embodiments, the scheduling agent 752 can be a container scheduler such as KUBERNETES®, DOCKER SWARM®, MESOS®, etc. The scheduling agent 752 can determine when to deploy VCIs 741 (or containers) to run posit operation agents 743 in response to a request received by the VCC 751 to perform an operations using a posit bit string. For example, if a request is received to perform a particular arithmetic and/or logical operation using a posit bit string, the scheduling agent 752 can deploy a VCI (e.g., the VCI 741-1) and/or a container to run a posit operation agent (e.g., the posit operation agent 743-1) to facilitate performance of the requested operation.

Figure 7B:
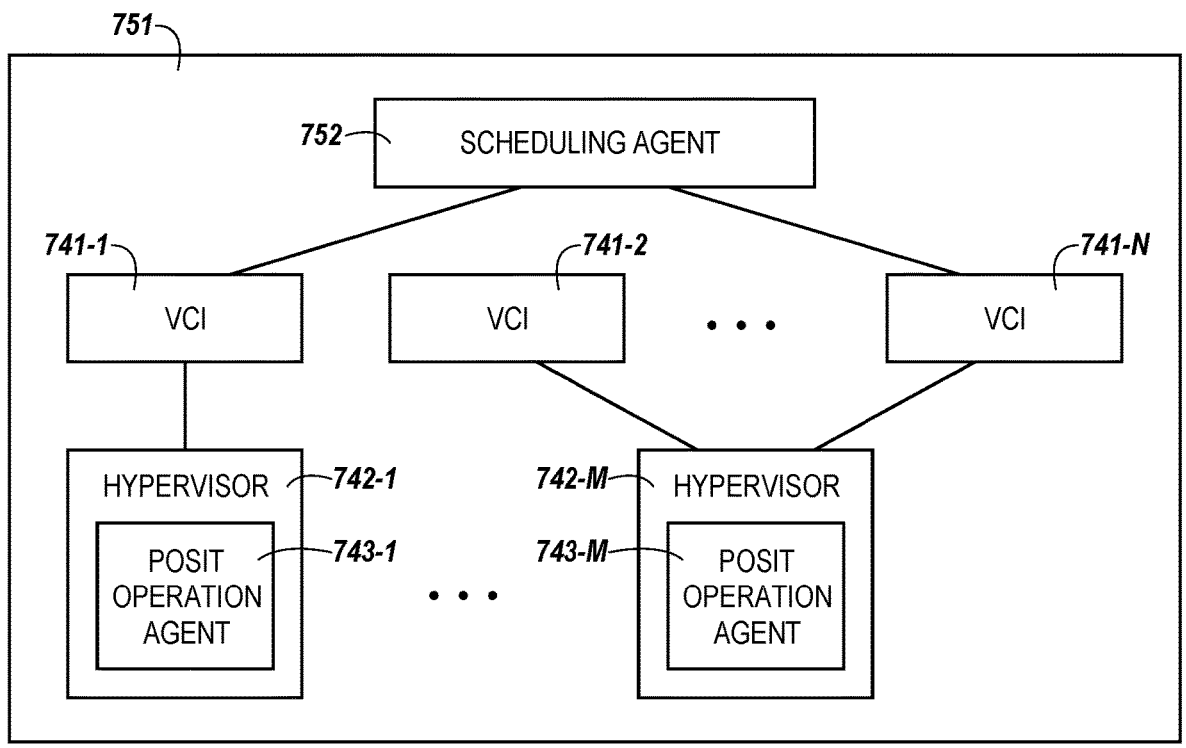
FIG. 7B is another diagram of a virtual computing cluster in accordance with a number of embodiments of the present disclosure.

FIG. 7B is another diagram of a virtual computing cluster 751 in accordance with a number of embodiments of the present disclosure. The VCC 751 can be deployed in a multi-user network such as the multi-user network 201 illustrated in FIG. 2B, herein. As shown in FIG. 7B, the cluster 751 (e.g., the VCC) can include a plurality of virtual computing instances (VCIs) 741 provisioned with a pool of computing resources (e.g., processing resources 645 and/or memory resources 647 illustrated in FIG. 6, herein) and executable by hardware. In some embodiments, at least a first VCI (e.g., the VCI 741-1) is deployed on a first hypervisor (e.g., the hypervisor 742-1) of the VCC 751 and at least a second VCI (e.g., the VCI 741-2) is deployed on a second hypervisor (e.g., the hypervisor 742-M) of the VCC 751. Although not explicitly shown, in some embodiments, the VCIs 741 can include containers.

The hypervisors 742-1, . . . , 742-M can include respective posit operation agents 743. For example, a first posit operation agent 743-1 can be deployed on a first hypervisor 742-1 and an $M^{th}$ posit operation agent 743-M can be deployed on an $M^{th}$ hypervisor 741-M. As described above, the posit operation agents 743 can be configured to perform or cause performance of operations such as converting bit strings between various formats, as well as arithmetic and/or logical operations using converted (e.g., posit) bit strings. The posit operation agents are described in more detail in connection with FIGS. 8 and 9, herein.

In some embodiments, the posit operation agents 743 can be provisioned with computing resources and are executable by hardware. For example, the posit operation agents 743 can be provisioned with computing resources (e.g., processing resources, memory resources, etc.) available to a multi-user network, such as the multi-user network 201 illustrated in FIG. 2B, herein. As described in more detail herein, due to the dynamic nature of the multi-user network, the posit operation agents 743 can be deployed on VCIs (as shown in FIG. 7A), or the posit operation agents 743 can be deployed on hypervisors 742, as shown in FIG. 2B. Regardless of where the posit operation agents 743 are deployed, they can be, however, ultimately executed by hardware that is available to the multi-user network or VCC 751.

The posit operation agents 743 can be configured to receive a request to perform at least one of an arithmetic operation and a logical operation between a first posit bit string operand and a second posit bit string operand, as described above. In some embodiments, the posit operation agents 743 can be configured to allocate an amount of computing resources available to perform the arithmetic operation and/or the logical operation between the first posit bit string operand and the second posit bit string operand and/or cause performance of the arithmetic operation and/or the logical operation between the first posit bit string operand and the second posit bit string operand. The amount of computing resources allocated by the posit operation agent 743 for performance of the operations can be based on various parameters, such as the parameters described above in connection with Table 1.

In some embodiments, circuitry (e.g., the logic circuitry 122 illustrated in FIG. 1, the acceleration circuitry 220 illustrated in FIG. 2A, the FPGA 221 and/or the ASIC 223 illustrated in Figured 2B) can be communicatively coupled to the VCC 751, as shown in FIG. 2B. For example, since the VCC 751 can be deployed in a multi-user network, such as the multi-user network 201 illustrated in FIG. 2B, the circuitry can be accessible to the VCC 751. In some embodiments, the posit operation agents 743 can cause the first posit bit string operand and the second posit bit string operand to be loaded into the logic circuitry, and the circuitry can be configured to perform the arithmetic operation and/or the logical operation between the first posit bit string operand and the second posit bit string operand, as described above.

If the bit strings are not available in the posit format (e.g., if the requested bit strings are stored in the floating-point format, for example), the posit operation agent 743 can access the circuitry and cause a first floating-point bit string and a second floating-point bit string to be loaded into the circuitry. Embodiments are not limited to floating-point bit strings, however, and the bit strings can be in other numerical formats, such as a fixed width format, etc.

Once the bit strings are loaded into the circuitry, the circuitry can convert the first floating-point bit string to a posit format to generate the first posit bit string operand and convert the second floating-point bit string to the posit format to generate the second posit bit string operand. Subsequent to converting the floating-point bit strings to the posit format, the circuitry can perform the arithmetic operation and/or the logical operation between the first posit bit string operand and the second posit bit string operand, as described in connection with FIGS. 1, 2A-2B, and 5, herein.

As described above, the posit operation agent 743 can receive various parameters and perform (or cause performance of) operations to convert bit strings between various formats and perform arithmetic and/or logical operations using the bit strings. For example, the posit operations agent 743 can receive parameters as part of a request command to perform the operations receive from a computing node, such as the computing node 207 illustrated in FIG. 2B, herein.

For example, the posit operation agent 743 can receive a processing resource parameter corresponding to performance of the arithmetic operation and/or the logical operation and allocate the amount of computing resources available to perform the arithmetic operation and/or the logical operation based, at least in part, on the processing resource parameter. In another example, the posit operation agent 743 can receive a processing time parameter corresponding to performance of the arithmetic operation and/or the logical operation and allocate an amount of time available to perform the arithmetic operation and/or the logical operation based, at least in part, on the processing time parameter.

In yet another example, the posit operation agent 743 can receive a posit precision parameter corresponding to performance of the at least one of the arithmetic operation and the logical operation and set a bit length for the first posit bit string operand and the second posit bit string operand based, at least in part, on the posit precision parameter and/or set an exponent bit length for the first posit bit string operand and the second posit bit string operand based, at least in part, on the posit precision parameter.

FIG. 8 is a diagram of an apparatus 853 in accordance with a number of embodiments of the present disclosure. The apparatus 853 can include a database 854, a subsystem 855, and/or a number of engines, for example posit operation engine 856, and can be in communication with the database 854 via a communication link. The apparatus 853 can include additional or fewer engines than illustrated to perform the various functions described herein. The apparatus 853 can represent program instructions and/or hardware of a machine (e.g., machine 957 as referenced in FIG. 9, etc.). As used herein, an "engine" can include program instructions and/or hardware, but at least includes hardware. Hardware is a physical component of a machine that enables it to perform a function. Examples of hardware can include a processing resource, a memory resource, a logic gate, etc. In some embodiments, the apparatus 853 can be analogous to the posit operation agent 643 illustrated and described in connection with FIG. 6, herein.

The engine(s) (e.g., 856) can include a combination of hardware and program instructions that are configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic) can be considered as both program instructions and hardware.

In some embodiments, the posit operation engine 856 can include a combination of hardware and program instructions that can be configured to perform the operations described above in connection with the posit operation agent 643 and/or 743 of FIGS. 6 and 7A-7B.

FIG. 9 is a diagram of a machine 957 in accordance with a number of embodiments of the present disclosure. The machine 957 can utilize software, hardware, firmware, and/or logic to perform a number of functions. The machine 957 can be a combination of hardware and program instructions configured to perform a number of functions (e.g., actions). The hardware, for example, can include a number of processing resources 945 and a number of memory resources 947, such as a machine-readable medium (MRM) or other memory resources 947. The memory resources 947 can be internal and/or external to the machine 957 (e.g., the machine 957 can include internal memory resources and have access to external memory resources). In some embodiments, the machine 957 can be a virtual machine, or the machine 957 can be a server. The program instructions (e.g., machine-readable instructions (MRI)) can include instructions stored on the MRM to implement a particular function (e.g., an action involving logic circuitry in a multi-user network such as converting bit strings between various formats, performing arithmetic and/or logical operations on the converted bit strings, etc. within a multi-user network). The set of MRI can be executable by one or more of the processing resources 945. The memory resources 947 can be coupled to the machine 957 in a wired and/or wireless manner. For example, the memory resources 947 can be an internal memory, a portable memory, a portable disk, and/or a memory associated with another resource, e.g., enabling MM to be transferred and/or executed across a network such as the Internet. As used herein, a "module" can include program instructions and/or hardware, but at least includes program instructions.

The memory resources 947 can be non-transitory and can include volatile and/or non-volatile memory. Volatile memory can include memory that depends upon power to store information, such as various types of dynamic random-access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid-state drive (SSD), etc., as well as other types of machine-readable media.

The processing resources 945 can be coupled to the memory resources 947 via a communication path 958. The communication path 958 can be local or remote to the machine 957. Examples of a local communication path 958 can include an electronic bus internal to a machine, where the memory resources 947 are in communication with the processing resources 945 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 958 can be such that the memory resources 947 are remote from the processing resources 945, such as in a network connection between the memory resources 947 and the processing resources 945. That is, the communication path 958 can be a network connection. Examples of such a network connection can include a local area network (LAN), wide area network (WAN), personal area network (PAN), and the Internet, among others.

As shown in FIG. 9, the MRI stored in the memory resources 947 can be segmented into a number of modules, e.g., 959, that when executed by the processing resource(s) 945, can perform a number of functions. As used herein a module includes a set of instructions included to perform a particular task or action. The module(s) 959 can be sub-modules of other modules. Examples are not limited to the specific module(s) 959 illustrated in FIG. 9.

The module(s) (59 can include program instructions and/or a combination of hardware and program instructions that, when executed by a processing resource 945, can function as a corresponding engine as described with respect to FIG. 8. For example, the posit operation module 959 can include program instructions and/or a combination of hardware and program instructions that, when executed by a processing resource 945, can function as the posit operation engine 856 illustrated and described in connection with FIG. 8.

FIG. 10 is a flow diagram representing an example method 1060 involving arithmetic and logical operations in a multi-user network in accordance with a number of embodiments of the present disclosure. At block 1062, the method 1060 can include receiving a request to perform an arithmetic operation and/or a logical operation between a first operand and a second operand. As shown at block 1062 of the method 1060, the request can include a parameter corresponding to an amount of shared computing resources to be allocated for performance of the arithmetic operation and/or the logical operation. Receiving the request to perform the arithmetic operation and/or the logical operation between the first operand and the second operand can further include receiving a request to perform the arithmetic operation and/or the logical operation using a posit bit string operand as at least one of the first operand and the second operand. For example, in some embodiments, at least one of the first operand and the second operand can be a posit bit string operand.

As described above in connection with Table 1, the parameter can include a parameter that corresponds to an amount of time allowed to perform the at least one of the arithmetic operation and the logical operation, an amount of processing resources allowed to perform the at least one of the arithmetic operation and the logical operation, and/or a first bit string length and a first exponent bit length for the first bit string operand and a second bit sting length and a second exponent bit length for the second bit string.

In some embodiments, the method 1060 can further include causing performance of the at least one of the arithmetic operation and the logical operation during the amount of time allowed to perform the at least one of the arithmetic operation and the logical operation and/or causing performance of the at least one of the arithmetic operation and the logical operation using the allowed amount of processing resources specified by the parameter. Embodiments are not so limited, however, and in some embodiments, the method 1060 can further include setting the first bit string length and the first exponent bit length for the first bit string operand based on the parameter, setting the second bit string length and the second exponent bit length for the second bit string operand based on the parameter, and/or causing performance of the at least one of the arithmetic operation and the logical operation using the first bit string operand and the second bit string operand.

At block 1064, the method 1060 can include allocating, based, at least in part, on the parameter, the amount of shared computing resources to be used in performance of the arithmetic operation and/or the logical operation. For example, the method 1060 can include allocating a particular amount of processing resources for performance of the arithmetic operation and/or the logical operation as described above in connection with Table 1.

At block 1066, the method 1060 can further include causing performance of the arithmetic operation and/or the logical operation using the allocated amount of shared computing resources. In some embodiments, causing performance of arithmetic operation and/or the logical operation using the allocated amount of shared computing resources can further include enabling logic circuitry communicatively coupled to the shared computing resources to perform the arithmetic operation and/or the logical operation. The logic circuitry can be analogous to the logic circuitry 122 illustrated in FIG. 1, herein.

The method 1060 can further include generating a graphical user interface to be displayed by a computing node connected to a pool of shared computing resources that includes the amount of shared computing resources and/or receiving the request via an input provided to the graphical user interface. The graphical user interface can include prompts and/or selectable items that can allow a user to choose parameters for performance of the operations described herein. For example, the graphical user interface can include prompts and/or selectable items corresponding to an amount of processing resources (e.g., a number of computing cores) to be used in performance of the operation, an amount of time in which to perform the operation (e.g., a processing time parameter), a bit length of the operands to be used in performance of the operation, and/or a quantity of exponent bits for the operands to be used in performance of the operation.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
    circuitry couplable to a pool of shared computing resources deployed in a multi-user network, wherein the circuitry is to:
        receive a request to perform an arithmetic operation or a logical operation, or both, using at least one operand, wherein the request includes a parameter corresponding to performance of the operation using the at least one operand, wherein the parameter corresponds to a bit length of the at least one operand, a quantity of exponent bits of the at least one operand, or both; and
        perform the arithmetic operation or the logical operation, or both, using the at least one operand based, at least in part, on the received parameter.

2. The apparatus of claim 1, wherein the circuitry is to access an amount of computing resources among the pool of shared computing resources specified by the parameter for use in performance of the arithmetic operation or the logical operation, or both, using the at least one operand.

3. The apparatus of claim 1, wherein the circuitry is to perform the arithmetic operation or the logical operation, or both, using the at least one operand for a particular amount of time specified by the parameter.

4. The apparatus of claim 1, wherein the circuitry comprises a field-programmable gate array or an application-specific integrated circuit.

5. The apparatus of claim 1, wherein the circuitry is to:
    receive at least one floating-point bit string; and
    generate, prior to performance of the at least one of the arithmetic operation and the logical operation, the at least one operand by converting the at least one floating-point bit string to a bit string having a format that is different than a floating-point format.

6. The apparatus of claim 1, wherein the circuitry is to request allocation of an amount of processing resources and an amount of memory resources from the pool of shared computing resources for use in performance of the arithmetic operation or the logical operation, or both, in response to receipt of the request to perform the operation.

7. The apparatus of claim 1, wherein the circuitry is to retrieve the at least one operand from a memory location within the pool of shared computing resources prior to performance of the arithmetic operation or the logical operation, or both.

8. A method, comprising:
    receiving a request to perform an arithmetic operation or a logical operation, or both, between a first operand and a second operand, wherein;
        the request includes a parameter corresponding to an amount of shared computing resources to be allocated for performance of the arithmetic operation or the logical operation, or both, and
        the parameter includes a first bit string length and a first exponent bit length for the first operand and a second bit string length and a second exponent bit length for the second operand; and
    causing performance of the arithmetic operation or the logical operation, or both, using the first operand and the second operand using the allocated amount of shared computing resources.

9. The method of claim 8, wherein receiving the request to perform the arithmetic operation or the logical operation, or both, between the first operand and the second operand further comprises receiving a request to perform the arithmetic operation or the logical operation, or both using a posit bit string operand as at least one of the first operand and the second operand.

10. The method of claim 8, wherein causing performance of the arithmetic operation or the logical operation, or both, using the allocated amount of shared computing resources further comprises enabling circuitry communicatively coupled to the shared computing resources to perform the arithmetic operation or the logical operation, or both.

11. The method of claim 8, further comprising:
    generating a graphical user interface to be displayed by a computing node connected to a pool of shared computing resources that includes the amount of shared computing resources; and
    receiving the request via an input provided to the graphical user interface.

12. The method of claim 8, wherein the parameter corresponds to an amount of time allowed to perform the arithmetic operation or the logical operation, or both, and wherein
    the method includes causing performance of the arithmetic operation or the logical operation, or both, during the amount of time allowed to perform the arithmetic operation or the logical operation, or both.

13. The method of claim 8, wherein the parameter corresponds to an amount of processing resources allowed to perform the arithmetic operation or the logical operation, or both, and wherein
    the method includes causing performance of the arithmetic operation or the logical operation, or both, using the allowed amount of processing resources specified by the parameter.

14. The method of claim 8, wherein the request to perform an arithmetic operation or a logical operation, or both is generated by a virtual computing instance in communication with the amount of shared computing resources.

15. A system, comprising:
    a multi-user network comprising a pool of shared computing resources;
    a computing node configured to access the multi-user network; and
    circuitry couplable to the pool of shared computing resources, wherein the circuitry is to:
        receive a request from the computing node to perform an arithmetic operation or a logical operation, or both, using at least one operand;

receive a parameter from the computing node corresponding to performance of the operation using the at least one operand, the parameter comprising a bit string length and an exponent bit length for the first operand;

set the bit string length and the exponent bit length for the at least one operand based on the parameter prior to performance of the arithmetic operation or the logical operation, or both; and cause, based, at least in part, on the request and the received parameter, performance of the arithmetic operation or the logical operation, or both, using the pool of shared computing resources.

16. The system of claim 15, wherein the circuitry is to:

request, based on the received parameter, allocation of an amount of computing resources from the pool of shared computing resources to be used in performance of the arithmetic operation or the logical operation, or both; and cause performance of the arithmetic operation or the logical operation, or both, using the allocated amount of computing resources.

17. The system of claim 15, wherein the parameter includes an amount of time allowed to perform the arithmetic operation or the logical operation, or both, and wherein the circuitry is to cause performance of the arithmetic operation or the logical operation, or both, within the allowed amount of time.

18. The system of claim 15, wherein the circuitry comprises a field-programmable gate array or an application-specific integrated circuit.

19. The system of claim 15, wherein the circuitry is configured to:

receive at least one floating-point bit string;

generate, prior to performance of the arithmetic operation or the logical operation, or both, the at least one operand by converting the at least one floating-point bit string to a format different than a floating-point format.

20. The system of claim 15, wherein the circuitry is to access a memory location within the pool of shared computing resources to retrieve the at least one operand prior to performance of the arithmetic operation or the logical operation, or both.

* * * * *